(12) United States Patent
Sumiyoshi et al.

(10) Patent No.: US 8,276,705 B2
(45) Date of Patent: Oct. 2, 2012

(54) WHEEL LOADER

(75) Inventors: Ryohei Sumiyoshi, Sakai (JP); Kunihiro Suzuki, Sakai (JP)

(73) Assignee: Kubota Corporation, Osaka (JP)

( * ) Notice: Subject to any disclaimer, the term of this patent is extended or adjusted under 35 U.S.C. 154(b) by 905 days.

(21) Appl. No.: 12/282,493

(22) PCT Filed: Mar. 16, 2007

(86) PCT No.: PCT/JP2007/055345
§ 371 (c)(1),
(2), (4) Date: Feb. 11, 2009

(87) PCT Pub. No.: WO2007/111158
PCT Pub. Date: Oct. 4, 2007

(65) Prior Publication Data
US 2009/0252586 A1     Oct. 8, 2009

(30) Foreign Application Priority Data

Mar. 29, 2006 (JP) .................................. 2006-092023
Mar. 29, 2006 (JP) .................................. 2006-092024

(51) Int. Cl.
*B60K 17/00* (2006.01)
(52) U.S. Cl. ...................................... 180/306; 188/152
(58) Field of Classification Search .................. 180/306, 180/53.4, 305, 307, 168; 188/18 R, 72.4, 188/353, 354–355, 151 A; 192/221
See application file for complete search history.

(56) References Cited

U.S. PATENT DOCUMENTS

| 3,688,879 | A  | * | 9/1972  | Buletti et al. ................. 188/353 |
| 3,973,805 | A  | * | 8/1976  | Stevenson et al. ................. 303/9 |
| 4,673,221 | A  | * | 6/1987  | Hayashi et al. ............. 303/9.75 |
| 5,919,243 | A  |   | 7/1999  | Huh |
| 6,208,926 | B1 | * | 3/2001  | Wagner et al. .................. 701/70 |
| 6,631,320 | B1 | * | 10/2003 | Holt et al. ........................ 701/83 |
| 6,834,551 | B2 | * | 12/2004 | Komine et al. ................. 73/798 |
| 7,971,889 | B2 | * | 7/2011  | Way et al. ............. 280/124.157 |

FOREIGN PATENT DOCUMENTS

| JP | 56064041 A  | 6/1981 |
| JP | 622472 U    | 1/1987 |
| JP | 07090883 A  | 4/1995 |
| JP | 09184169 A  | 7/1997 |
| JP | 2005171608 A| 6/2005 |

* cited by examiner

*Primary Examiner* — John Walters
*Assistant Examiner* — James Triggs
(74) *Attorney, Agent, or Firm* — The Webb Law Firm

(57) ABSTRACT

A wheel loader having good operability. The wheel loader has a machine body travelably supported on wheels; a working device supported on the machine body, the working device having a boom swingably supported at its base end side on the machine body, an arm swingably supported at and connected to the forward end side of the boom, and a working tool swingably provided on the forward end side of the arm; travel operation means for performing travel operation of the machine body; and a brake for braking, when the travel operation means is not operated and the arm is swung, the wheels in operative association with the swing of the arm.

11 Claims, 15 Drawing Sheets

WHEEL LOADER

BACKGROUND OF THE INVENTION

1. Technical Field

The present invention relates to wheel loader having a machine body travelably supported on wheels and a work device mounted on the machine body.

2. Background Art

Conventionally, there is provided a wheel loader having a machine body travelably supported on front and rear wheels, and a work device supported to a front portion of the machine body, the work device including a boom having a base portion thereof supported to the machine body to be vertically pivotable, an arm pivotally connected to the leading end of the boom to be pivotable in the fore/aft direction, and a work implement pivotally attached to the leading end of the arm (see Patent Document 1).

Patent Document 1: Japanese Patent Application "Kokai" No. 2005-171608

In the case of the conventional wheel loaders, e.g. one having a bucket, as the work implement, oriented to the front side, with the rear face side thereof being pivoted to the leading end of the arm, so that the bucket is capable of scooping/dumping operations, when a scooping operation for scooping a working target such as earth/sand, compost, snow, etc., or a digging operation is to be carried out, under a working posture where the pivot of the bucket is located downwardly of the pivot of the arm and the bottom face of the bucket faces the ground surface, the arm is pivotally operated to bring the bucket closer to the machine body and then from this condition, the arm is pivoted forward to cause the bucket to effect the scooping action. This mode of operation has the advantage that a great amount of earth/sand or the like can be scooped by the bucket.

In the above case, under the condition of the arm being pivoted to bring the bucket closer to the machine body, the machine body is caused to travel forward to bring the leading end of the bucket closer to or into contact with the earth/sand or the like. Under this condition, the machine body is stopped and the arm will be pivoted forwardly to cause the bucket to effect the scooping action. In the course of this, when the scooping action of the bucket is started with the operator moving his/her foot off the traveling pedal to the brake pedal, during the period from the detachment of the foot from the traveling pedal to stepping on the brake pedal with the same foot, there occurs a problem that the machine body may be inadvertently moved rearward due to the reaction force from the earth/sand or the like.

This problem can be solved if the driver starts the scooping action, with the brake being applied by a stepping operation on the brake pedal. In this case; however, there will occur momentary suspension in the series of operations from the forward traveling to the scooping action, during the drive's moving his/her foot from the traveling pedal to the brake pedal. As a result, the operational efficiency deteriorates.

Further, the driver needs to confirm that the brake pedal has been stepped on and then to start operating the arm. Hence, there is another problem of troublesome operation and poor working efficiency.

Incidentally, similar problems occur also, in the case of a construction wherein the bucket as a work implement is pivoted to the leading end of the arm to be capable of raking/dumping actions or in the case of effecting similar actions with a different work implement (e.g. the case when the work implement is subjected to a reaction force from the working object when the arm is pivoted).

Then, the object of the present invention is to provide a wheel loader with improved operability.

SUMMARY OF THE INVENTION

According to a characterizing construction of a wheel loader relating to the present invention, the wheel loader comprises:

a machine body travelably supported on wheels;

a work device including a boom having a base portion thereof pivotally supported to the machine body, an arm pivotally connected to the leading end of the boom, and a work implement pivotally provided to the leading end side of the arm;

a travel operating means for operating travel of the machine body; and a brake configured to brake the wheels in association with a pivotal movement of the arm when said travel operating means is not operated and said arm is pivoted.

Further, in the above-described construction, preferably, there is provided a hydraulic operating type brake for braking the wheels; wherein when said travel operating means is not operated and said arm has been pivoted, a portion of work oil fed to an arm cylinder for pivoting the arm is fed to said brake, so that said brake is actuated by this work oil.

Further, in above-described construction, preferably, a work oil passageway extending from said arm cylinder to said brake incorporates therein a first switchover valve for allowing passage of the work oil from the arm cylinder to the brake when the travel operating means is not operated and for inhibiting said passage when the travel operating means is operated; and between said first switchover valve and said arm cylinder, there is provided a second switchover valve for allowing passage of the work oil from the arm cylinder to the first switchover valve when the arm is pivoted and for inhibiting said passage when the arm is not pivoted.

Further, in above-described construction, preferably, there is provided a pressure relief circuit for relieving pressure in a pipe passage extending between the first switchover valve and the second switchover valve when the travel operating means is operated and the arm is not pivoted.

Further, in above-described construction, preferably, a work oil passageway extending from said arm cylinder to said brake incorporates therein a first switchover valve for allowing passage of the work oil from the arm cylinder to the brake when the travel operating means is not operated and for inhibiting said passage when the travel operating means is operated; and between said first switchover valve and said brake, there is provided a second switchover valve for allowing passage of the work oil from the first switchover valve to said brake when the arm is pivoted and for inhibiting said passage when the arm is not pivoted.

Further, in above-described construction, preferably, said second switchover valve is switched over in response to either a hydraulic signal sent from a pilot valve for operating an arm control valve for controlling said arm cylinder or an electric signal transmitted when an arm operating means for operating the arm is operated.

Further, in above-described construction, preferably, said second switchover valve comprises a plurality of electromagnetic valves, including an electromagnetic switchover valve which is switched over for allowing passage of work oil if said arm operating means is operated to pivot the arm in one direction, and an electromagnetic switchover valve which is switched over for allowing passage of work oil if said arm operating means is operated to pivot the arm in the other direction.

Further, in above-described construction, preferably, said brake is operable also in response to work oil fed by a traveling line brake operating means which is manually operated during traveling; and either the work oil fed by said traveling line brake operating means or the work oil fed from the arm cylinder side when the travel operating means is not operated and the arm is pivoted can be fed selectively via a shuttle valve.

With the above-described construction, when the travel operating means is not operated and the arm has been pivoted, the wheels are braked in operative association with the pivotal movement of the arm. Hence, even if a work on a working object is started while the operation of the travel operating means is released, the inadvertent movement of the machine body due to the reaction force from the earth/sand as the working object can be avoided. So that the series of operations can proceed smoothly without interruption.

Further, in above-described construction, preferably, there is provided a differential device for transmitting power outputted from the engine to the right and left wheels; and said brake brakes the power inputted to said differential device.

As the brake is provided for braking the power inputted to the differential device, the brake can be applied while the torque is small. Hence, the load to the brake can be lessened, so that the automatic brake can be formed compact and also the right and left wheels can be braked by one automatic brake.

DESCRIPTION OF THE PREFERRED EMBODIMENTS

Next, embodiments of the present invention will be described with reference to the accompanying drawings.

Figure 1:
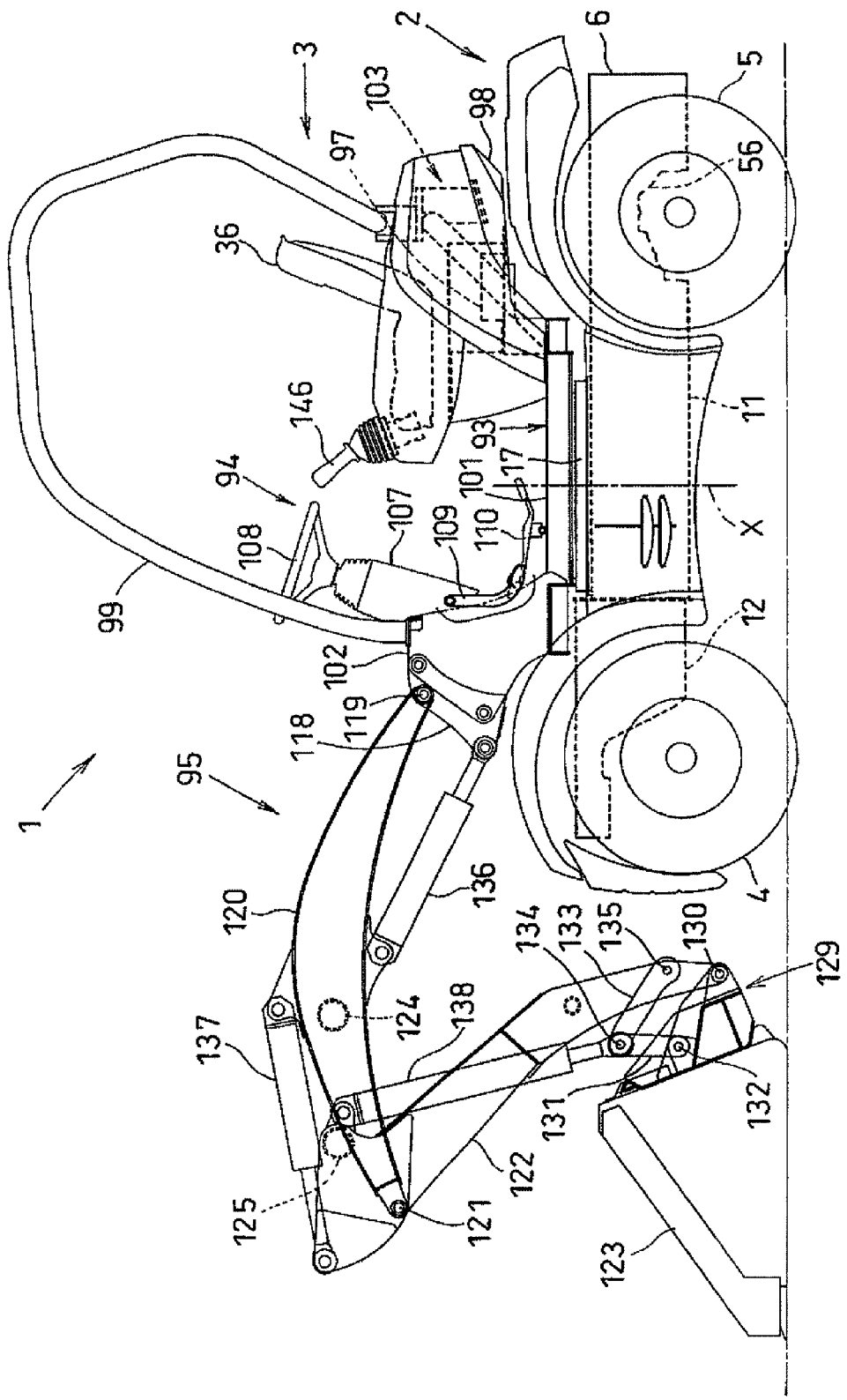
FIG. 1 is a side view of a wheel loader.
Figure 2:
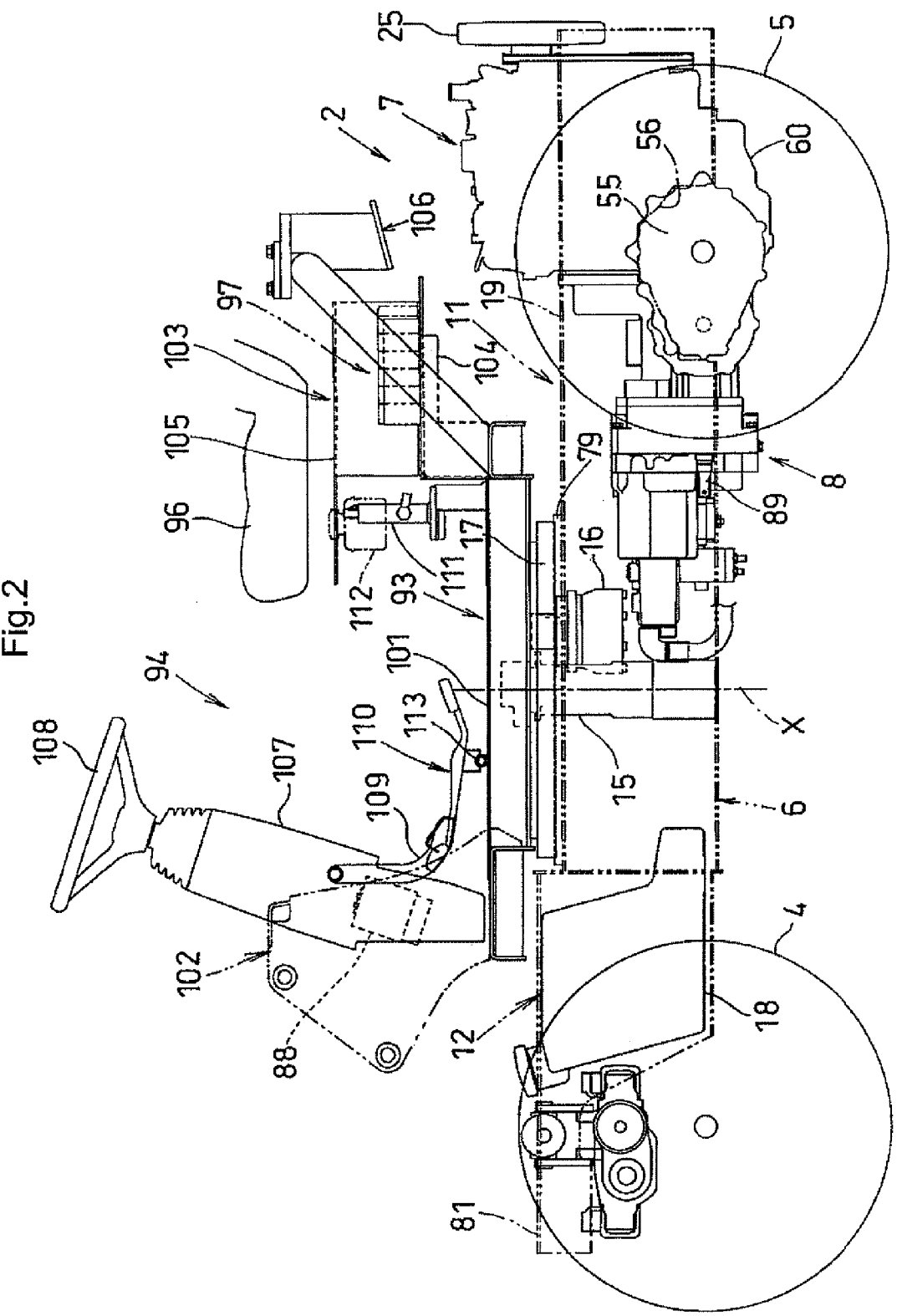
FIG. 2 is a side view showing a traveling body and a swivel machine body.
Figure 3:
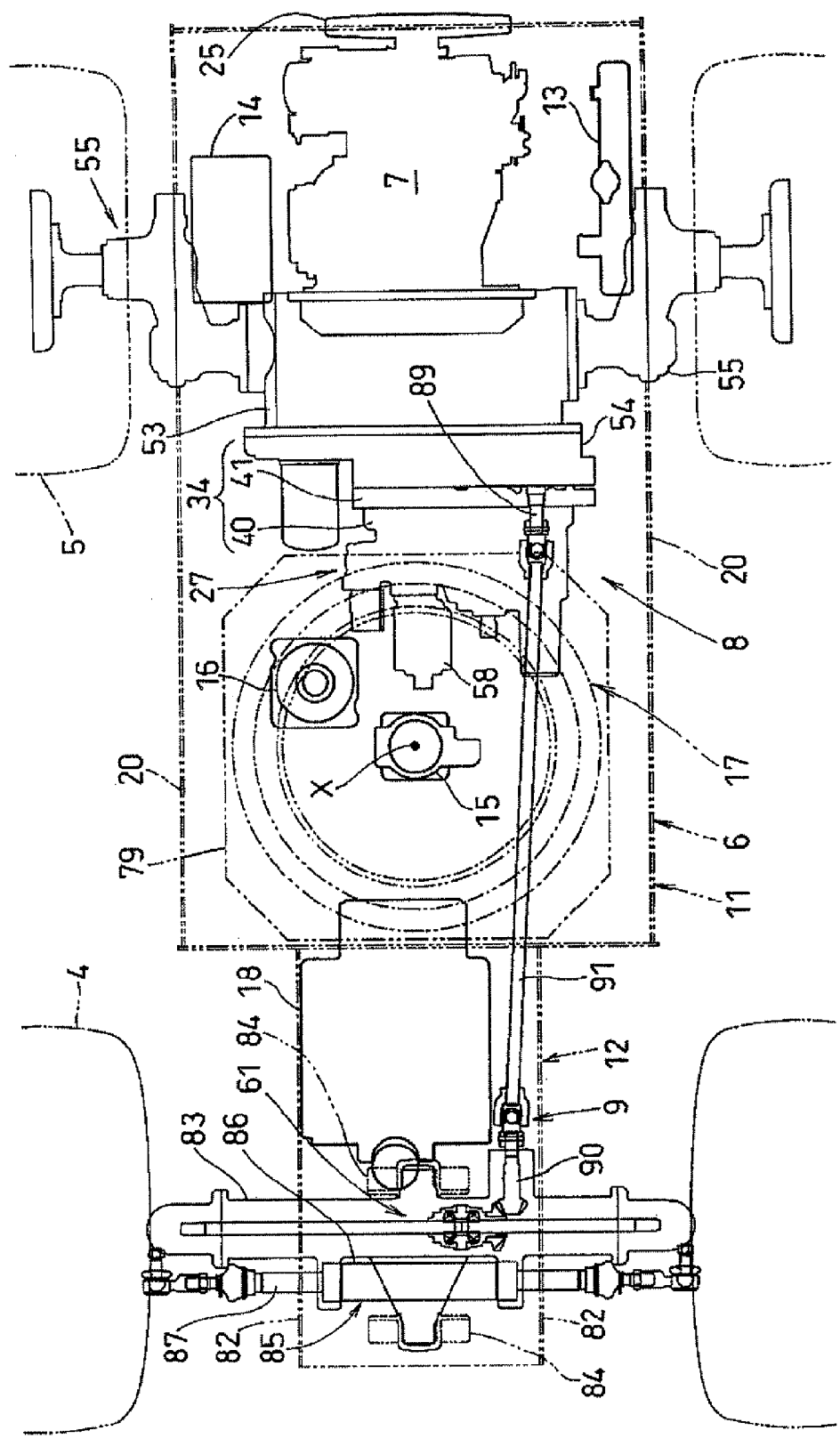
FIG. 3 is a plan view of the traveling body.

In FIGS. 1 through 3, numeral 1 denotes a compact wheel loader for city use, to be used in home gardening for example. This wheel loader 1 includes a traveling body 2 disposed on the lower side and a swivel body 3 disposed on the upper side.

The traveling body 2 comprises a wheel type traveling body 2 travelable by a pair of right and left front wheels 4 and a pair of right and left rear wheels 5, a traveling machine body 6 supported by the front and rear wheels 4, 5, an engine 7 mounted on the traveling machine body 6, a traveling line main transmission mechanism 8 for transmitting power of the engine 7 to the rear wheels 5, and a front wheel power transmission mechanism 9 for transmitting power taken off the traveling line main power transmission mechanism 8 to the front wheels 4.

The traveling machine body 6 includes a main frame 11 and a front frame 12 provided forwardly of this main frame 11. The main frame 11 mounts thereon the engine 7, a radiator 13, a battery 14, a swivel joint 15, a swivel motor 16, a swivel bearing 17, etc. The front frame 12 mounts thereon a fuel tank 18 for reserving fuel for the engine 7. A rear portion of the main frame 11 is supported on the right and left rear wheels 5, and a front portion of the front frame 12 is supported on the right and left front wheels 4. With these, the traveling machine body 6 is rendered travelable.

The main frame 11 is comprised of plate members and includes an upper wall 19, right and left side walls 20 extending downward from right and left side edges of the upper wall 19, a front wall 21 fixed to the front ends of the upper wall 19 and the right and left side walls 20, and a rear wall 22 interconnecting rear end lower portions of the right and left side walls 20, with the main frame 11 being a downwardly opened.

The engine 7 is arranged longitudinally at the right/left center side at a rear portion between the right and left side walls 20, with an axis of a crankshaft thereof being oriented along the fore/aft direction and also with an output shaft 23 thereof projecting forwardly. An upper end side of this engine 7 projects upward from an aperture defined in the upper wall 19 of the main frame 11.

Rearwardly of the engine 7, a cooling fan 25 is provided. The radiator 13 is disposed on the left side of the engine 7. And, a battery 14 is disposed on the right side of the engine 7.

Figure 4:
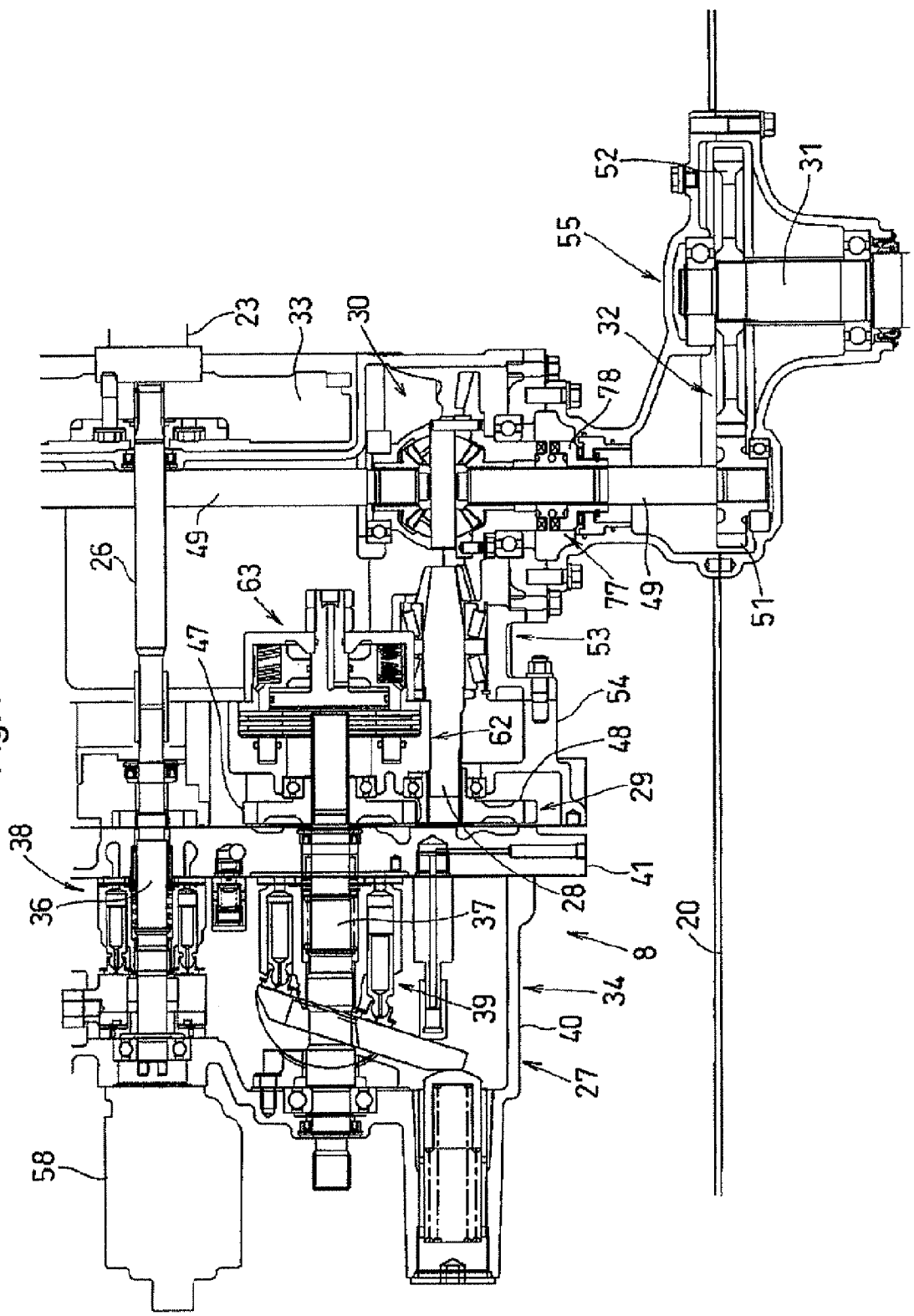
FIG. 4 is a plan view in section showing a traveling line power transmission mechanism.
Figure 7:
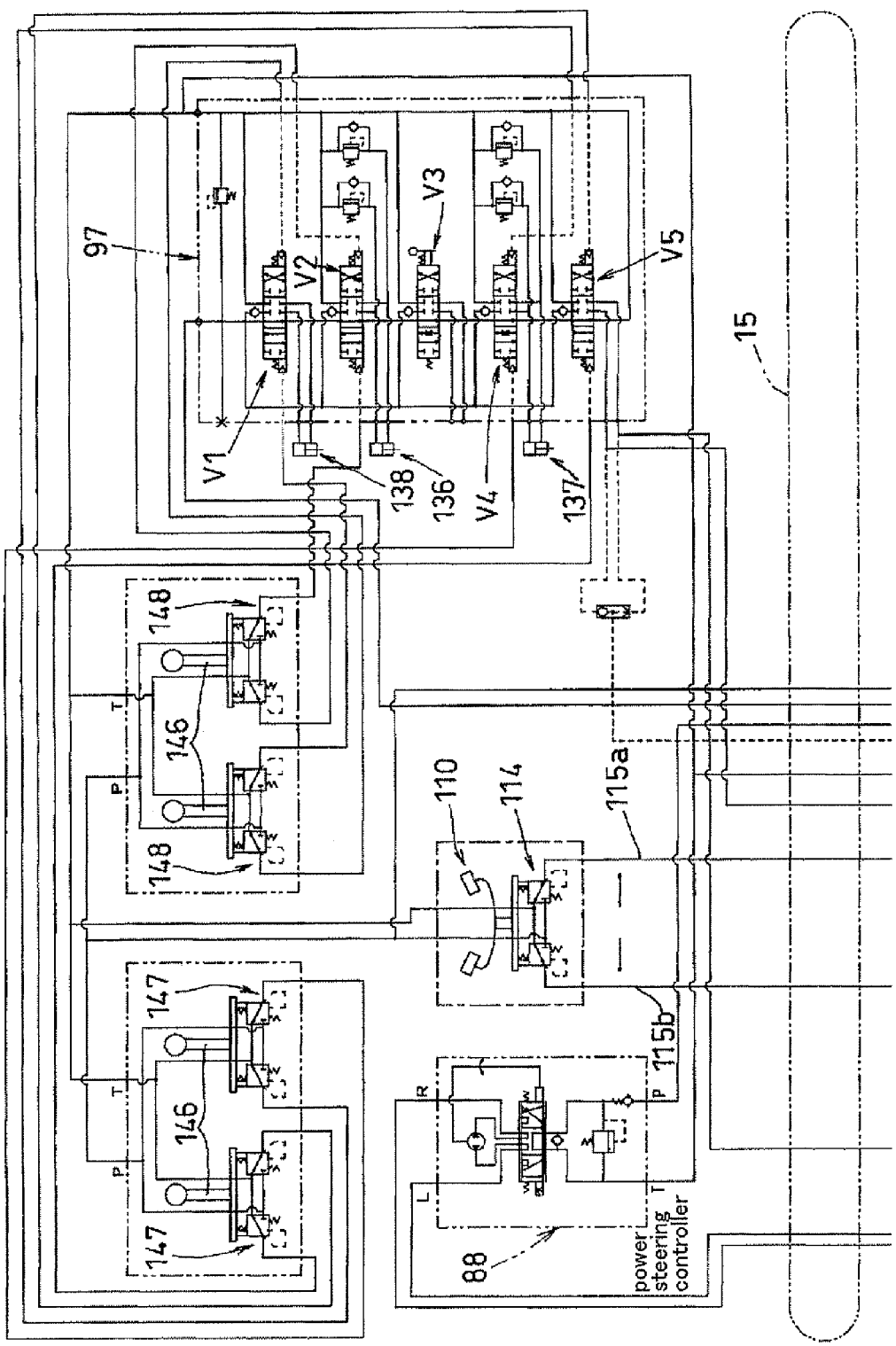
FIG. 7 is a hydraulic circuit diagram of a swivel boy side of a hydraulic circuit of the wheel loader.
Figure 8:
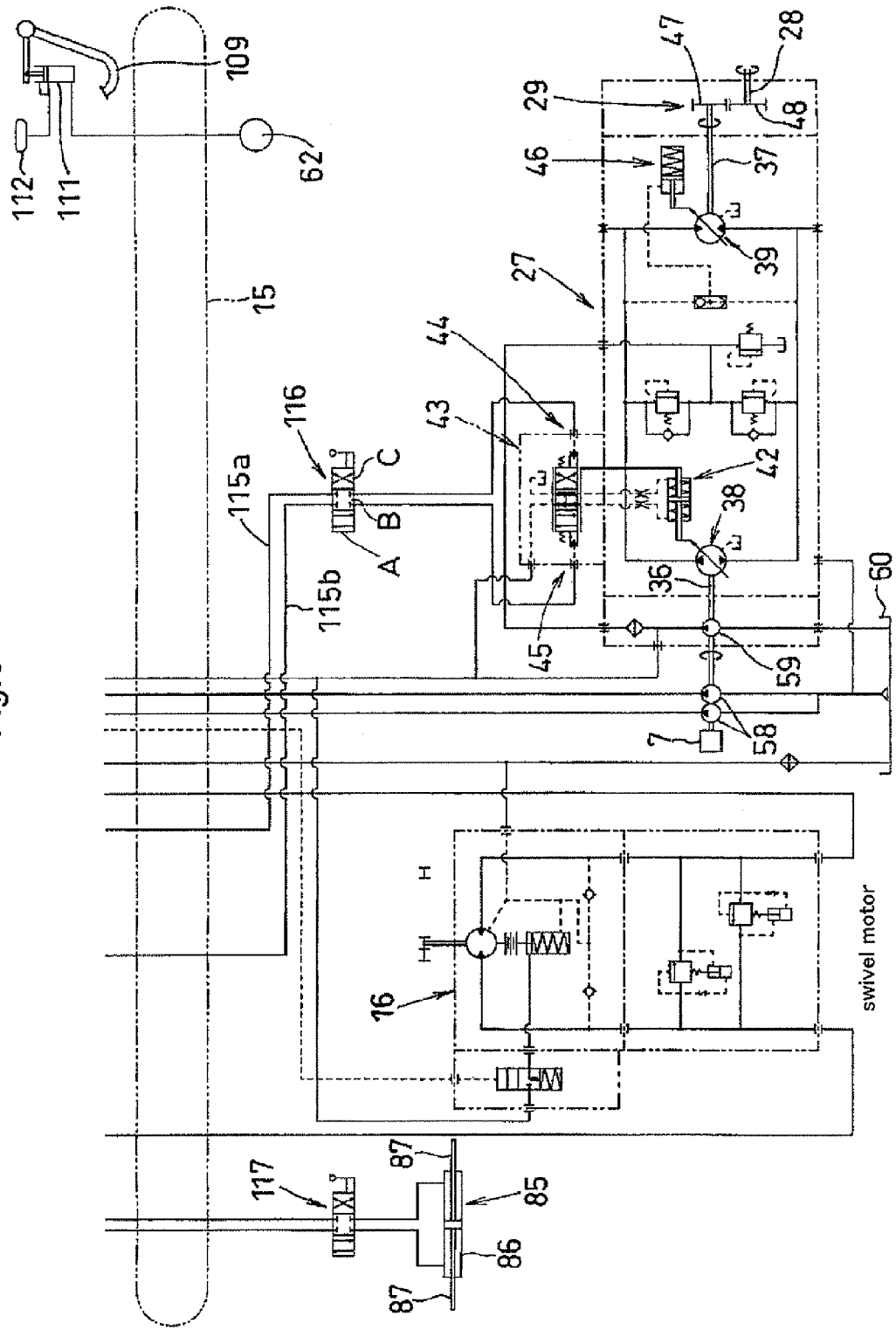
FIG. 8 is a hydraulic circuit diagram of a traveling body side of the hydraulic circuit of the wheel loader.

As shown in FIG. 4, FIG. 7 and FIG. 8, the traveling line main power transmission mechanism 8 includes a traveling propelling shaft 26 receiving power from the engine 7, a hydrostatic transmission ("HST" hereinafter) 27 receiving the power from the traveling propelling shaft 26, a mechanical transmitting means 29 for transmitting the power from the HST 27 to a bevel pinion shaft 28, a rear wheel differential device 30 receiving the power from the bevel pinion shaft 28, and right and left final transmission devices 32 transmitting the power transmitted to the rear wheel differential device 30 to the right and left rear wheels 31. The traveling propelling shaft 26, the HST 27, the mechanical transmitting means 29, the bevel pinion shaft 28 and the rear wheel differential device 30 are disposed forwardly of the engine 7, and the final transmission devices 32 are arranged to extend from the sides of the rear wheel differential device 30 to the front lateral side of the engine 7.

The traveling propelling shaft 26 is disposed along the fore/aft direction on the front side of the engine 7 and has its rear end side connected to a flywheel 33 connected to the output shaft 23 of the engine 7.

The HST 27 includes an input shaft 36 for receiving the power from the engine 7, and an output shaft 37 for outputting power to the rear wheel differential mechanism 30, with the axes thereof being aligned with the fore/aft direction. This HST 27 includes a hydraulic pump 38 mounted on the input shaft 36 and a hydraulic motor 39 mounted on the output shaft 37, so that this transmission is configured such that the hydraulic motor 39 is driven by work oil fed by the hydraulic pump 38 driven by the input shaft 36 and the power is outputted from the output shaft 37 driven by the hydraulic motor 39.

A casing 34 consists of a main body 40 having a rear face side thereof open and a lid body 41 closing the rear face side opening of the main body 40; and the input shaft 36 and the output shaft 47 project rearward from the lid body 41.

The input shaft 36 of the HST 27 is arranged forwardly of the traveling propelling shaft 26 and coaxial with this propelling shaft 26 and operably coupled via coupling with the traveling propelling shaft 26.

The hydraulic pump 38 comprises a variable displacement pump and its swash angle is variable by means of a swash plate controlling actuator 42. In operation, when the angle of the swash plate is changed, the flow amount of the work oil discharged to the hydraulic motor 39 is varied, so that the rotational speed the output shaft 37 (vehicle speed) can be changed. Further, this hydraulic pump 38 is capable of switching over the rotational direction of the output shaft 37 to the forward (forward rotation) or the reverse (reverse rotation) by changing the flow direction of the work oil discharged to the hydraulic motor 39.

The swash plate controlling actuator 42 is controlled by a forward/reverse switchover means 43 comprised of a pilot operation switchover servo valve operated by pilot work oil. When a pilot operation pressure is developed at a forward side port 44 of this forward/reverse switchover means 43, the swash plate of the hydraulic pump 38 is controlled so as to cause the output shaft 37 to be rotated forwardly. When a pilot operation pressure is developed at a reverse side port 45 of this forward/reverse switchover means 43, the swash plate of the hydraulic pump 38 is controlled so as to cause the output shaft 37 to be rotated in reverse. forwardly. Also, by a degree of pressure developed at the forward side port 44 or a reverse side port 45, the flow amount of the work oil discharged from the hydraulic pump 38 is controlled, thereby controlling the rotational speed of the output shaft 37.

The hydraulic motor 39 comprises a variable displacement motor and has the angle of its swash plate variable in two steps by means of a high/low switchover actuator 46. So that, with change in the angle of the swash plate, the rotational power outputted from the output shaft 37 can be switched over between a high speed state and a low speed stage.

The bevel pinion shaft 28 is disposed on the left side of a portion of the output shaft 37 of the HST 27 which portion projects rearward from the lid body 41 and disposed downwardly and in parallel with the same, the bevel pinion shaft 28 extending more rearward than the rear end of the output shaft 37 of the HST 27 and forming a bevel gear portion at the rear end thereof.

The mechanical transmitting means 29, in the instant embodiment, comprises a gear transmission mechanism consisting of a drive side gear 47 mounted on the portion of the output shaft 37 of the HST 27 projecting rearward from the lid body 41 to be rotatable therewith and a driven side gear 48 mounted on the front end side of the bevel pinion shaft 28 to be rotatable therewith and meshed with the driven side gear 47, and this transmitting means is configured also as a speed reducing mechanism.

Incidentally, this mechanical transmitting means 29 can also be an accelerating mechanism (speed changing mechanism) or a constant speed mechanism, and can be a mechanism for effecting power transmission such as coupling.

The rear wheel differential device 30 is disposed rearwardly of the bevel pinion shaft 28 and forwardly of the left side of the engine 7 and has a differential output shaft 49 projecting to the right and left sides thereof.

Rear axles 31 are disposed rearwardly of the differential output shaft 49 of the rear wheel differential device 30 and overlapped with the engine 7 in the side view, the rear wheel 5 being fixedly mounted on the outer end side of each one of the right and left rear axles 31 to be rotatable therewith.

The final transmission device 32 comprises a gear transmission mechanism including a drive side gear 51 mounted on the right/left outer end portion of the differential output shaft 49 to be rotatable therewith and a driven side gear 52 mounted on the rear axle 31 to be rotatable therewith and this device is configured as a speed reducing mechanism.

Incidentally, this final transmission device 32 too can be an accelerating mechanism (speed changing mechanism) or a constant speed mechanism.

With the traveling main transmission mechanism 8 having the above-described construction in operation, the power transmitted forwardly from the engine 7 is turned over at the HST 27 to be transmitted rearward and then transmitted by the rear wheel differential device 30 forwardly of the engine 7 to be transmitted to the right and left sides and then transmitted rearward by the final transmission device 32 to reach the rear wheels 31. Hence, the mechanism is formed compact in the fore/aft direction.

To the front face side of the engine 7, there is fixedly connected a housing 53 housing the flywheel 33, the rear wheel differential device 30, etc. To the front face side of this housing 53, there is fixedly connected a transmission case 54 housing the mechanical transmission means 29, etc. To the front face side of this transmission case 54, there is fixedly connected a casing 34 (the lid body 41 thereof of the HST 27. Further, to the engine 7, there are attached the rear wheel differential device 30, the mechanical transmission means 39, the HST 27, etc. to be integral therewith. And, the housing 53, the transmission case 54 and the casing 34 are disposed between the right and left side walls 20 of the main frame 11.

Further, to the right and left sides of the housing 53, there are fixed final transmission cases 55 housing the final transmission devices 32. And, to each one of the right and left final transmission case 55, the rear axle 31 is supported and the final transmission cases 55 are fixedly attached to the main frame 11.

With each one of the right and left transmission cases 55, its front and right/left inner end side thereof is bolt-fixed to the lateral face of the housing 53 and a rear end side of each one of the right and left final transmission cases 55 is bolt-fixed to an upper portion side of the side wall 20 of the main frame 11.

On the lower side of the rear portion of the right/left side wall 20 of the main frame 11, there is formed a cutout portion 56 open downward so as to engage from above the upper portion of the final transmission case 55, and the final transmission case 55 is bolt-fixed to the main frame side wall 20 around this cutout portion 56.

Further, the front portion side of the engine 7 is supported to the main frame 11 via the housing 53 and the final transmission case 55 and the rear portion side of the engine 7 is supported via a connecting plate or the like to the rear wall 22 of the main frame 11.

With the traveling body 2 having the above-described construction, the rear wheel differential device 30 is provided forwardly of the engine 7 and the rear axle 31 receiving the power from this rear wheel differential device 30 to rotate the rear wheel 5 is disposed at a position rearwardly of the differential output shaft 49 and overlapped with the engine 7 in the side view. Hence, the wheel loader 1 is formed compact in the fore/aft direction.

To the front face side of the HST 27, there is attached a main pump 58 comprised of a double gear pump operably coupled to the front end side of the input shaft 36 of the HST 27 and driven by the power of the engine 7. The work oil from this main pump 58 is fed via the swivel joint 15 to various hydraulic actuators mounted on the wheel loader 1.

Further, this wheel loader 1 includes a sub pump 59 driven by the engine 7 to feed the work oil mainly for pilot pressure. The work oil for pilot pressure from this sub pump 59 is fed via the swivel joint 15 to the pilot valve mounted on the wheel loader 1 and the work oil from this sub pump 79 is fed also to the forward/reverse switchover means 43, etc.

Incidentally, in the instant embodiment, an oil pan 60 provided on the lower end side of the engine 7 is utilized as a work oil tank for reserving the work oil for the hydraulic components.

Figure 5:
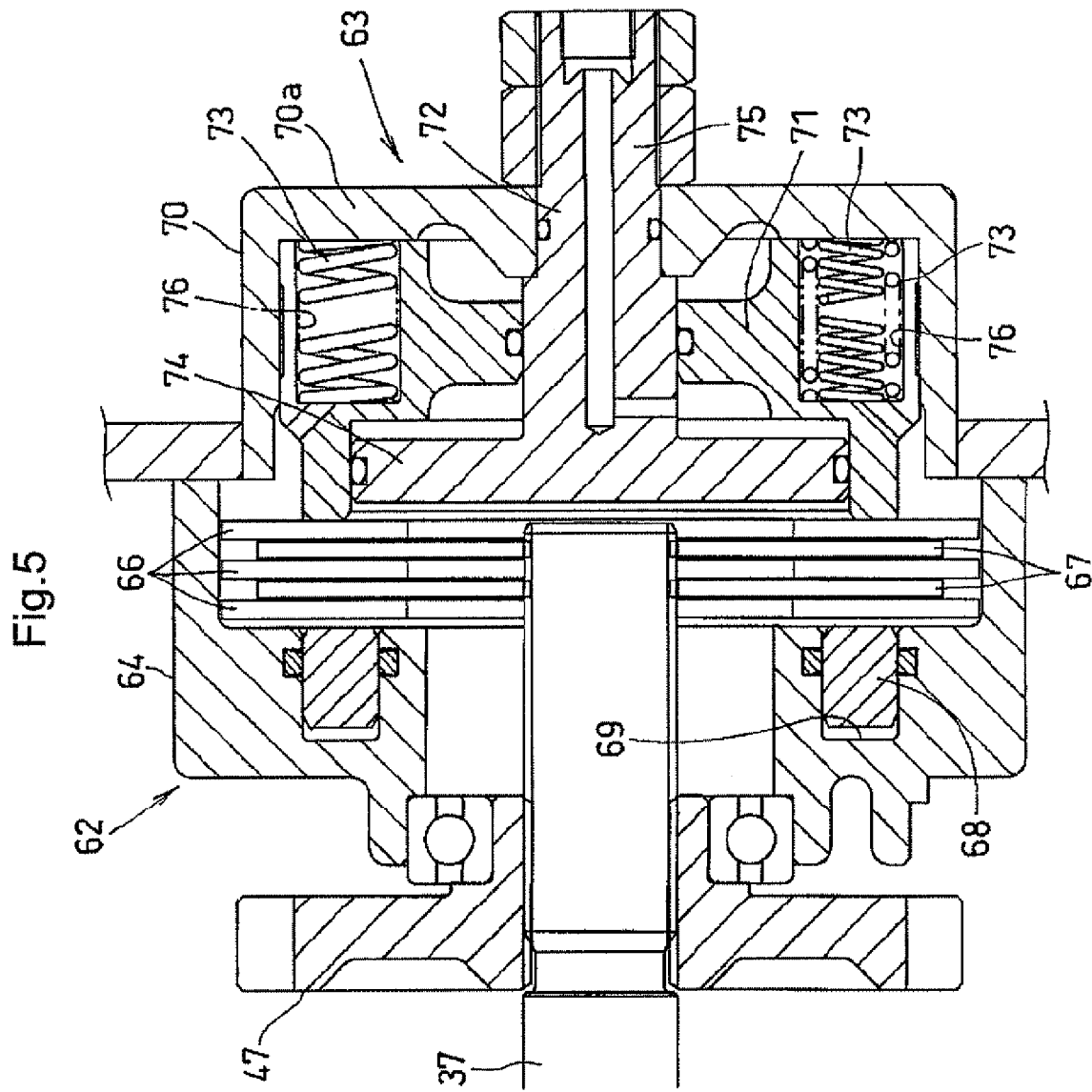
FIG. 5 is a plan view in section showing a main brake and a parking brake.

Further, as shown in FIG. 4 and FIG. 5, the traveling main power transmission mechanism 8 includes a main brake (traveling brake, an automatic brake) 62 and a parking brake 63. The main brake 62 is a hydraulically operated brake for braking the traveling power transmitted, at the time of traveling or working, etc., from the HST 27 to the rear wheel differential device 30 and a front wheel differential device 61 to be described later (inputted to the rear wheel differential device 30 and the front wheel differential device 61). The parking brake 63 is a hydraulically operated brake for maintaining the front wheels 4 and the rear wheels 5 under stopped conditions at the time of parking. These brakes 62, 63 are disposed rearwardly of the drive side gear 47 of the mechanical transmitting means 29.

The main brake 62 is housed in the transmission case 54. This main brake 62 includes a main brake case 64 fixed to the transmission case 54, a plurality of plates 66 housed in the main brake case 64 to be movable in the fore/aft direction and non-rotatable therein, brake discs 67 interposed between these brake plates 66, and main brake pistons 68 for bringing the brake discs 67 and the plates 66 into pressed contact with each other.

The main brake case 64 is open rearward and into this main brake case 64, the rear end side of the output shaft 37 of the HST 27 is inserted. On this rear end side of the output shaft 37 inserted into the main brake case 64, the brake discs 67 are mounted to be axially (fore/aft direction) movable and rotatable in unison.

The main brake pistons 68 are disposed in opposition to each other on the forward side of the front end side plates 66 and are housed inside rearwardly open piston housing portions 69 provided in the main brake case 64 to be movable in the fore/aft direction and to be projectable and retractable.

Further, the parking brake 63 is disposed rearwardly of the main brake 62 and this parking brake 63 includes a parking brake piston 71 housed inside a housing 53 and fixed to this housing 53, a piston support member 72 fixed to a parking brake case 70 and a spring 73 for pressing the parking brake piston 71 to bring the brake disc 67 and the plates 66 into pressed contact with each other.

The parking brake case 70 is open forwardly and this parking brake case 70 is in communication with the main brake case 64.

The piston support member 72 consists of a disc portion 74 disposed in opposition to the rear end plate 66 and a rod portion 75 projecting rearward from the center of this disc portion 74 and extending through a rear wall 70a of the parking brake case 70 to project rearward. And, the rod portion 75 is fixed to the rear wall 70a of the parking brake case.

The parking brake piston 71 is mounted on the piston support member 72 to be movable in the fore/aft direction.

The spring 73 is housed in a spring housing portion 76 in the parking brake piston 71 to be open rearward and is compressed between the parking brake piston 71 and the rear wall 70a of the parking brake piston 70.

With the main brake 62 having the above-described construction in operation, as the work oil is fed to the rear face side of the main brake piston 68 (the forward side of the main brake piston 68 in the illustrated example) of the piston housing portion 69, this work oil presses the main brake piston 68, whereby this main brake piston 68 is moved rearward to press the brake disc 67 and the plate 66 against the parking brake piston 71 of the parking brake 66 and the brake disc 67 and the plate 66 are compressed against each other. With this, the main brake 62 is actuated to brake the output shaft 37 of the HST 27 (braking the rear wheels 5 and the front wheels 4).

Also, with the parking brake 63 having the above-described construction in operation, at the time of stop of the engine 7 (parking), as the spring 73 presses the parking brake piston 71 to press the brake disc 67 and the plate 66 against the main brake case 64, the brake disc 67 and the plate 66 are compressed against each other, whereby the front wheels 4 and the rear wheels 5 are maintained under the stop condition.

Further, when the engine 7 is started, the work oil from the main pump 58 or the sub pump 59 is fed to the gap between the rear face of the disc portion 74 of the piston support member 72 and the parking brake piston 71, so that the hydraulic pressure of this work oil moves the parking brake piston 71 rearward against the urging force of the spring 73, thus releasing the pressed contact between the brake disc 67 and the plate 66.

With the above-described brake construction, the main brake 62 is comprised of a disc brake and the brake disc 67 and the plate 66 of this disc brake are used also as the parking brake 63.

Further, on the left side of the rear wheel differential device 30, there is provided a differential lock device 77. As shown in FIG. 4, this differential lock device 77 is a hydraulically operated differential lock device 77 configured such that as a differential lock shifter 78 operable in unison with a left side differential output shaft 49 is moved by the work oil toward the rear wheel differential device 30 against a return spring to mesh engaging teeth of this differential lock shifter 78 with engaging teeth provided in the rear wheel differential device 30 side, thereby to inhibit a differential action of the rear wheel differential device 30, thus providing the differential lock effect.

On the upper face side of the upper wall 19 at the front portion of the main frame 11, there is provided a bearing attaching plate 79 formed of a thick plate. And, on this bearing attaching plate 79, there is fixedly attached an outer race of the swivel bearing 17 and the center of this swivel bearing 17 forms a swivel axis X.

Further, on the inner peripheral side of the inner race of the swivel bearing 17, there is formed an inner toothed wheel and a pinion meshed with this inner toothed wheel is fixed to an output shaft of a swivel motor 16 comprised of a hydraulic motor fixed to the main frame 11, so that by this swivel motor 16, the inner race of the swivel bearing 17 can be turned about the swivel axis X.

At a front portion of the main frame 11 between the right and left side walls 20, there is arranged a swivel joint 15 coaxial with the swivel axis X, so that the work oil is communicated via this swivel joint 15 between the traveling body 2 side and the swivel body 3 side.

The front frame 12 of the traveling machine body 6 are formed of plate members, and includes an upper wall 81, right and left side walls 82 extending downward from the right and left side edges of this upper wall 81, and a connecting plate interconnecting the front portions of the right and left side walls 82, the front frame 12 being downwardly open on its rear side.

On the front and lower side of the front frame 12, there is arranged a front axle case 83 oriented along the right/left direction, and on opposed fore/aft sides at the right/left center portion of this front axle case 83, there is arranged a front wheel bearing 84 supported to the front frame 12. To this fore/aft front wheel bearing 84, via a center pin, there is supported the front axle case 83 to be pivotable about a fore/aft axis. And, to the right and left sides of this front axle case 83, via gear cases or the like, the front wheels 4 are supported to be steerable.

On the front side of this front axle case 83, there is arranged along the right/left direction, a steering cylinder 85 comprised of a hydraulic cylinder for steering the front wheels 4. This steering cylinder 85 includes piston rods 97 projecting from the right and left sides of the cylinder tube 86. Each right/left piston rod 97 is operably coupled with the front wheel 4 disposed on the same right/left side, and the steering cylinder 85 is controlled by a power steering controller 88 provided on the swivel body 3 side.

At the rear portion of the front frame 12 between the right and left side walls 82, there is arranged the fuel tank 18 for reserving the foil for the engine 7.

The front wheel power transmission mechanism 9 for transmitting power to the front wheels 4 includes a front wheel power takeoff (PTO) shaft 89 connected to the driven side gear 48 of the mechanical transmitting means 29 and projecting forwardly from the transmission case 54, the front wheel differential device 61 provided inside the front axle case 83, a bevel pinion gear 90 for inputting the power to the front wheel differential device 61, a transmission shaft 91 for operably coupling this bevel pinion shaft 90 with the front wheel PTO shaft 98, and an unillustrated final speed reducing mechanism (transmission mechanism) for transmitting power from the differential output shaft 92 of the front wheel differential device 61 to the front wheels 4.

The swivel body 3 includes a swivel machine body 93 supported on the traveling machine body 6 to be swivellable about a vertically extending swivel axis, a traveling line control device 94, a work device (ground work device, a digging work device) 95, a driver's seat 96, a control valve 97 for controlling the work device 95 and the swivel machine body 93' a counter weight 98 for obtaining weight balance relative to the work device 95, a ROPS (roll-over protection system) 99, etc.

The traveling machine body 6 and the swivel machine body 93 together constitute the machine body of the wheel loader 1. The swivel machine body 93 consists mainly of a swivel deck 101 fixedly attached to the inner race of the swivel bearing 17 to be swivellable about the swivel axis X, a pair of right and left masts (work device supports) 102 mounted erect on front portions of this swivel deck 101, and a driver's seat disposing frame body 103 provided at a rear portion of the swivel deck 101.

The driver's seat disposing frame body 103 includes a support frame 104 fixed to the swivel deck 101, a seat deck 105 attached to this support frame 104 and mounting the drivers seat 96 to be pivoted forwardly and collapsible forwardly, and a weight attaching frame 106 to which the counter weight 98 is attached. Aid, to the support frame 104, the control valve 97 is fixedly attached.

Further, the front lower end of the ROPS 99 is fixed to the upper end sides of the masts 102 and the rear lower ends of the ROPS 99 are fixed to the weight attaching frame 106.

The traveling line control device 94 includes a steering wheel 108 and a brake pedal (traveling line brake operating means) 109 supported to a steering deck 107 disposed between the pair of right and left masts 102, and a traveling pedal (traveling operating means) 110 disposed forwardly of the driver's seat 96 and supported to the swivel deck 101.

The steering wheel 108 is capable of controlling the power steering controller 88 and the brake pedal 109 has an upper end side thereof supported to the steering deck 107 to be pivotable about an axis extending along the right/left direction, so that the pedal can be controlled by a manual stepping operation. When this brake pedal 109 is stepped on, work oil present in a master cylinder 111 is fed to the main brake 62 (the rear face side of the main brake piston 68 of the piston housing portion 69) thereby to activate the main brake 62.

The brake pedal 109 is urged by a return spring to a position assumed thereby prior to the stepping operation, when released from the stepping operation. Upon release of the stepping operation, the work oil fed to the main brake 62 is returned to the master cylinder 111.

The master cylinder 111 is disposed downwardly of the driver's seat 96 and in the vicinity thereof, there is provided a brake oil tank 112 for reserving work oil for the master cylinder 111.

The traveling pedal 110 is pivotally supported, at its fore/aft intermediate portion, to a support shaft 113 having an axis extending along the right/left direction. The pedal 110 allows manual stepping operation either forwardly or rearwardly as seen from the driver, and the pedal 110 is urged to return to the neutral position upon release of such forward or rearward stepping operation.

By stepping on this traveling pedal 110, a traveling remote control valve 114 comprised of a pilot valve can be operated. This traveling remote control valve 114 is operable to switch over the HST 27 between the forward traveling state and the reverse traveling state and to adjust the traveling speed of the traveling body 2, in response to a pilot operational pressure developed at the forward side port 44 or the reverse side port 45 of the forward/reverse switchover means 43 of the HST 27.

Further, in pilot oil passages 115a, 115b extending from the traveling remote control valve 114 to the forward/reverse switchover means 43, there is incorporated a forward/reverse switchover valve 116 for reversing switchover operation of the forward/reverse switchover means 43 by the traveling pedal 110 when the swivel deck 101 is swiveled from a forward facing posture to a rear facing posture.

This forward/reverse switchover valve 116 is comprised of a four-port, three-position switchover valve capable of switching over the flow of the pilot work oil flowing in the pilot oil passages 115a, 115b between the traveling remote control valve 114 and the forward/reverse switchover means 43 so as to feed the pilot work oil from this traveling remote control valve 114 to the forward/reverse switchover means 43.

With this forward/reverse switchover valve 116 in operation, when switched over to an A position, the pilot work oil from the traveling remote control valve 114 by a forward stepping operation of the traveling pedal 110 is fed to the forward side port 44 of the forward/reverse switchover means 43, whereas, by a rearward stepping operation on the traveling pedal 110, the work oil from the traveling remote control valve 114 is fed to the reverse side port 45 of the forward/ reverse switchover means 43. When the traveling pedal 110 is stepped to the forward side, the traveling body 2 travels forwardly. When the traveling pedal 110 is stepped to the rear side, the traveling body 2 travels in reverse.

Further, when the forward/reverse switchover valve 116 is switched over to a B position, the feeding of pilot work oil from the traveling remote control valve 114 to the forward/reverse switchover means 43 is stopped, thereby disabling traveling of the traveling body 2 by an operation on the traveling pedal 110.

Further, when the forward/reverse switchover valve 116 is switched over to a C position, by a forward stepping operation on the traveling pedal 110, the work oil from the traveling remote control valve 114 is fed to the reverse side port 45 of the forward/reverse switchover means 43. Whereas, by a rearward stepping operation on the traveling pedal 110, the work oil from the traveling remote control valve 114 is fed to the forward side port 44 of the forward/reverse switchover means 43. Hence, by stepping on the traveling pedal 110 to the forward side, the traveling body 2 travels in reverse. Whereas, by stepping on the traveling pedal 110 to the rear side, the traveling body 2 travels forwardly.

And, this forward/reverse switchover valve 116 is switched over to the A position when the swivel machine body 93 is at its front facing posture and is switched over to the C position when the swivel machine body 93 is at its rear facing posture and is switched over to the B position when the swivel machine body 93 is at its side facing posture.

Therefore, when the swivel machine body 93 assumes the front facing posture, by a forward stepping operation on the traveling pedal 110, the traveling body 2 travels forwardly; whereas by a rear stepping operation on the traveling pedal 110, the traveling body 2 travels in reverse. Further, when the swivel machine body 93 assumes the rear facing posture, by a forward stepping operation on the traveling pedal 110, the traveling body 2 travels in reverse, whereas by a rear stepping operation on the traveling pedal 110, the traveling body 2 travels forwardly. And, when the swivel machine body 93 assumes the side facing posture, traveling of the traveling body 2 is disabled.

Further, in a work oil flow passageway extending from the power steering controller 88 to the steering cylinder 85, there is incorporated a steering switchover means 117 for switching over the flow of work oil such that the steering direction of steering the steering wheel 108 and the turning direction of the traveling body 2 may in agreement with each other as seen from the driver seated at the driver's seat 96, whether the swivel machine body 93 assumes the front facing posture or the rear facing posture.

Incidentally, this steering switchover means 117 is operated to its neutral condition when the swivel machine body 93 assumes the side facing posture, so that the steering of the traveling body 2 is disabled, irrespectively of operation on the steering wheel 108.

Figure 6:
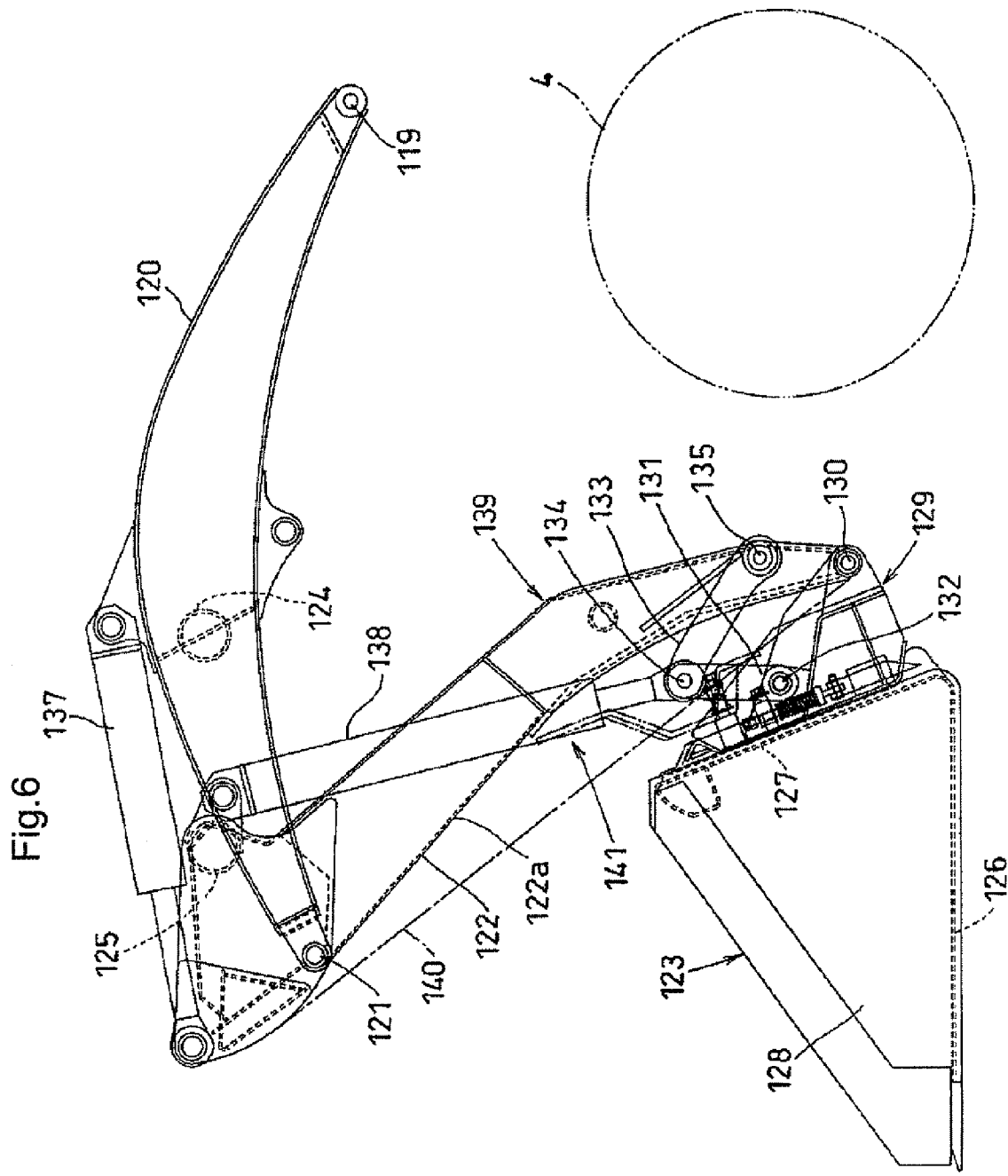
FIG. 6 is a side view of a work device.

The work device 95, as shown in FIG. 1 and FIG. 6, includes attaching members 118, booms 120 having a base portion thereof pivotally connected to an upper portion of the attaching member 118 to be pivotable about an axis along the right/left direction, and a pair of right and left arms 122 having a base portion thereof pivotally connected via an arm support shaft 121 to the leading end of the boom 120 to be pivotable about an axis along the right/left direction, and further includes one bucket 123 as a work implement.

The right and left attaching members 118 each is detachably attached via upper and lower connecting pins to the mast 102 disposed on the same side in the right/left direction, and a longitudinal intermediate portion of the right/left boom 120 and the base portion of the right/left arm 122 are connected to each other via a connecting member 124, 125, respectively.

The bucket 123 is used for effecting a scooping operation of earth/sand, compost, snow, etc, a ground working operation such as a digging operation and includes a bottom wall portion 126, a rear face wall portion 127 and right and left side wall portions 128. The bucket 123 has its rear face side detachably attached to an attaching member 129 provided at the leading end of the arms 122, so that the opening of the bucket may face the forward side when the bottom face thereof is placed in opposition to the ground surface.

The attaching member 129 is pivotally connected to the leading end side of the arm 122 via a bucket support shaft 130 to be pivotable about an axis along the right/left direction.

To this attaching member 129, one end of a first link 131 is pivotally connected via a pivot shaft 132 to be pivotable about an axis along the right/left direction. To the other end of this first link 131, one end of a second 133 is pivotally connected via a connecting shaft 134, to be pivotable about an axis along the right/left direction. The other end of this second link 133 is pivotally connected via a traverse shaft 135 to the leading end side of the arm 122 with an offset toward the opposite leading end than the bucket support shaft 130 to be pivotable about an axis along the right/left direction.

Downwardly of the base side (rear side) of each right/left boom 120, there is respectively disposed a boom cylinder 136, and one end side of this boom cylinder 136 is pivotally connected to a lower portion of the attaching member 118 and the other end side thereof is pivotally connected to a longitudinal intermediate portion of the lower face side of the boom 120. In association with an expansion/contraction of this boom cylinder 136, the boom 120 is pivoted about the boom support shaft 119 to be lifted up/down.

Upwardly of the leading end side (front side) of the boom 120, there is respectively disposed an arm cylinder 137. One end side of this arm cylinder 137 is pivotally connected to a longitudinal intermediate portion of the upper face side of the boom 120 and the other end side thereof is pivotally connected to the base portion side of the arm 122. In association with an expansion/contraction of this arm cylinder 137, the arm 122 is pivoted about the arm support shaft 121 to be pivoted back and forth.

Between the right and left arms 122, there is provided a single bucket cylinder 138. One end side of this bucket cylinder 138 is pivotally connected to a connecting member 125 interconnecting the base portions of the right and left arms 122 and the other end side thereof is pivotally connected via the connecting shaft 134 to the interconnecting portion between the first link 131 and the second link 133. In association with an expansion/contraction of this bucket cylinder 138, the bucket 123 is pivoted about the bucket support shaft 130 to effect a dumping action (downward pivotal movement) or a scooping action (upward pivotal movement).

The boom cylinder 136, the arm cylinder 137 and the bucket cylinder 136 are comprised of hydraulic cylinders.

As shown in FIG. 1 and FIG. 6, an attaching member 129 for attaching/supporting the bucket 123 is pivotally connected to the leading end side of the arm 122 in such a manner that under a working posture where the pivot (bucket support shaft 130) of the bucket 123 is located downwardly of the pivot (arm support shaft 121) of the arm 122 and the bottom face of the bucket 123 is disposed in opposition to the ground surface, the pivot 130 of the bucket 123 may be located downwardly on the rear face side of this bucket 123.

Further, the arm 122 is formed bent, at its longitudinal intermediate portion, to be concave in the direction rearwardly away from the bucket 123. The arm 122 is formed bent such that a front side longitudinal edge portion 122a of the arm 122 may be located rearwardly of a tangential line 140 tangent to the upper side and the lower side of this longitudinal edge portion 122a, and at the front side longitudinal intermediate portion of the arm 122, there is provided an interference-avoiding space 141 for avoiding interference with the rear face side upper end of the bucket 123 when the bucket 123 is operated to effect a scooping operation (upward pivotal movement).

More particularly, under the working posture where the pivot 130 of the bucket 123 is located downwardly of the pivot 121 of the arm 122 and the bottom face of the bucket 123 is placed in opposition to the ground surface and the arm 122 has been pivoted to bring the bucket 123 closer to the machine body of the wheel loader 1, the pivot 130 of the bucket 123 is located downwardly on the rear face side of the bucket 123. Further, the arm 122 is formed bent such that its longitudinally upper portion is inclined rearward as extending downward and its longitudinally lower portion extends substantially perpendicular (extending perpendicularly downward or inclined rearwardly or forwardly as extending downward) and with an inclination having an inclination angle smaller than the inclination angle of the upper portion side of the arm 122 relative to the perpendicular).

Incidentally, the lower portion of the arm 122 lower than the bent portion 139 of the arm 122 may be formed straight or curved.

With this construction, under the working posture where the pivot 130 of the bucket 123 is located downwardly of the pivot 121 of the arm 122 and the bottom face of the bucket 123 is placed in opposition to the ground surface, the pivot 130 of the bucket 123 is located downwardly of the rear face side of this bucket 123. For this reason, e.g. when the arm 122 is pivoted forwardly to penetrate the leading end of the bucket 123 into the earth/sand, it is possible to prevent the bucket 123 from escaping to the rear side, so that the leading end of the bucket 123 may penetrate into the earth/sand effectively.

Further, with the construction where the pivot 130 of the bucket 123 is located downwardly on the rear face side of the bucket 123, if the arm 122 extends straight from one end to the other end thereof, under the working posture where the pivot 130 of the bucket 123 is located downwardly of the pivot 121 of the arm 122 and the bottom face of the bucket 123 is placed in opposition to the ground surface, when the arm 122 is pivoted rearward to bring the bucket 123 closer to the machine body of the wheel loader 1, the upper end of the rear face of the bucket 123 is close to the arm 122. Hence, the bucket 123 cannot be brought too close to the machine body, in order to secure a spacing between the rear face upper end of the bucket 123 and the arm 122.

On the other hand, according to the present embodiment, the arm 122 is formed bent at is longitudinally intermediate portion so as to be concave rearwardly away from the bucket 123 (the interference avoiding space 141 is formed at the front edge intermediate portion of the arm 122). Hence, when the arm 122 is pivoted rearwardly to bring the bucket 123 closer to the machine body, sufficient spacing can be secured between the arm 122 and the rear face upper end of the bucket 123.

With this, even with the construction where the pivot 130 of the bucket 123 is disposed downwardly of the rear face side of the bucket 123, the bucket 123 can be moved closer to the machine body. For this reason, as the bucket 123 can be moved closer to the machine body, sufficient stroke can be obtained in the fore/aft direction of the bucket 123. And, it is also possible to increase (secure a sufficient angle) a pivot angle (angle formed between the bucket 123 bottom face and the ground surface) when the bucket 123 is pivoted with this bucket 123 being in the vicinity of the machine body.

Incidentally, in the instant embodiment, as the bucket 123, there is provided the bucket 123 capable of scooping/dumping operations. Instead, it is possible to provide a bucket 123 whose opening is oriented rearward under the posture of the bottom face in opposition to the ground surface, thus the bucket 123 being capable of raking/dumping actions. Or, any other work implement than the bucket 123 may be mounted.

Further, the bucket may be supported to a support body attached to the leading ends of the right and left arms and between the right and left arms so as to be pivotable about an axis extending normal to a bucket supporting face, so that as this bucket is pivoted for 180 degrees about the pivotal axis by a hydraulic actuator to be switched over between a first working posture capable of effecting a scooping action and a second working posture capable of effecting a raking action.

On the right and left sides of the driver's seat 96, there are provided operating levers (working line operating means) 146 for operating the work device 95 and the swivel machine body 93.

As shown in FIG. 7, referring to these right and left side operating levers 146, in the instant embodiment, the left operating lever 146 is configured for operating the swivel deck 101 and the arm 122 (arm operating means) and the right operating lever is configured for operating the boom 120 and the bucket 123.

Further, the control valve 97 includes a bucket control valve V1 for controlling the bucket cylinder 138, a boom control valve V2 for controlling the boom cylinder 136, a bucket pivot control valve V3 for controlling the hydraulic actuator for pivoting the bucket in case the bucket is attached to be switchable between a scooping posture and a raking posture, an arm control valve V4 for controlling the arm cylinder 137, and a swivel control valve V5 for controlling the swivel motor 16. This control valve 97 is constructed such that the respective control valves each comprised of a direct moving spool type switchover valve are connected in the direction normal to the sliding direction of the spool. In operation, work oil from the main pump 58 is fed via the swivel joint 15 to the control valve 97 and the oil is forwarded from the respective control valves V1-V5 to the respective actuators.

The bucket control valve V1, the boom control valve V2, the arm control valve V4, and the swivel control valve V5 are comprised of pilot operation switchover valves which are switched over by pilot work oil. The bucket pivot control valve V3 is comprised of a manual type switchover valve which is switched over by a switchover lever provided on the swivel machine body 93.

The left control lever 146 is attached to an arm/pivot remote control valve 147 comprised of a pilot valve for controlling the arm control valve V4 and the swivel control valve V5. The right control lever 146 is attached to a boom/bucket remote control valve 148 comprised of a pilot valve for controlling the boom control valve V2 and the bucket control valve V1, so that the respective remote control valves 147, 148 are operable by the control levers 146.

And, in the present embodiment, for instance, by pivoting the left control lever 146 back and forth, the arm control valve V4 is operated to pivot the arm 122 back and forth. By pivoting the left control lever 146 to the right and left, the swivel control valve V5 is operated to swivel the swivel machine body 93 to the right and left.

Further, by pivoting the right control lever 146 back and forth, the boom control valve V2 is operated to lift the boom 120 up and down. By pivoting the right control lever 146 to the right and left, the bucket control valve V1 is operated to cause the bucket 123 to effect a dumping/scooping action.

Incidentally, in the case of the wheel loader having a bucket pivotally supported to the leading end of the arm to be capable of effecting a scooping/dumping action, in case the loader is to effect a scooping operation for scooping earth/sand, compost, snow or the like, under the working posture where the pivot of the bucket is located downwardly of the pivot of the arm and the bottom face of the bucket is placed in opposition to the ground surface, after the arm has been pivoted to move the bucket closer to the machine body and then this arm is pivoted forwardly to cause the bucket to effect the scooping action, the machine body will be caused to travel forward with the arm pivoted to bring the bucket closer to the machine body to bring the leading end of the bucket close to or into contact with the earth/sand or the like. Then, the machine body will be stopped under this condition and the arm will be pivoted forward to cause the bucket to effect the scooping action. In the course of this, if the scooping operation is started with shifting the driver's foot off the traveling pedal to the brake pedal, during the period from removal of the foot from the traveling pedal to the stepping on the brake pedal by this foot, the machine body may be displaced rearward inadvertently due to the reaction force from the earth/sand or the like.

Then, with the wheel loader 1 according to the present embodiment, as shown in FIGS. 9-15, there is provided an automatic brake system 150 for braking the wheels 4, 5 in association with the pivotal movement of the arm 122 when the traveling pedal 110 is not operated and the arm 122 is pivoted.

Figure 9:
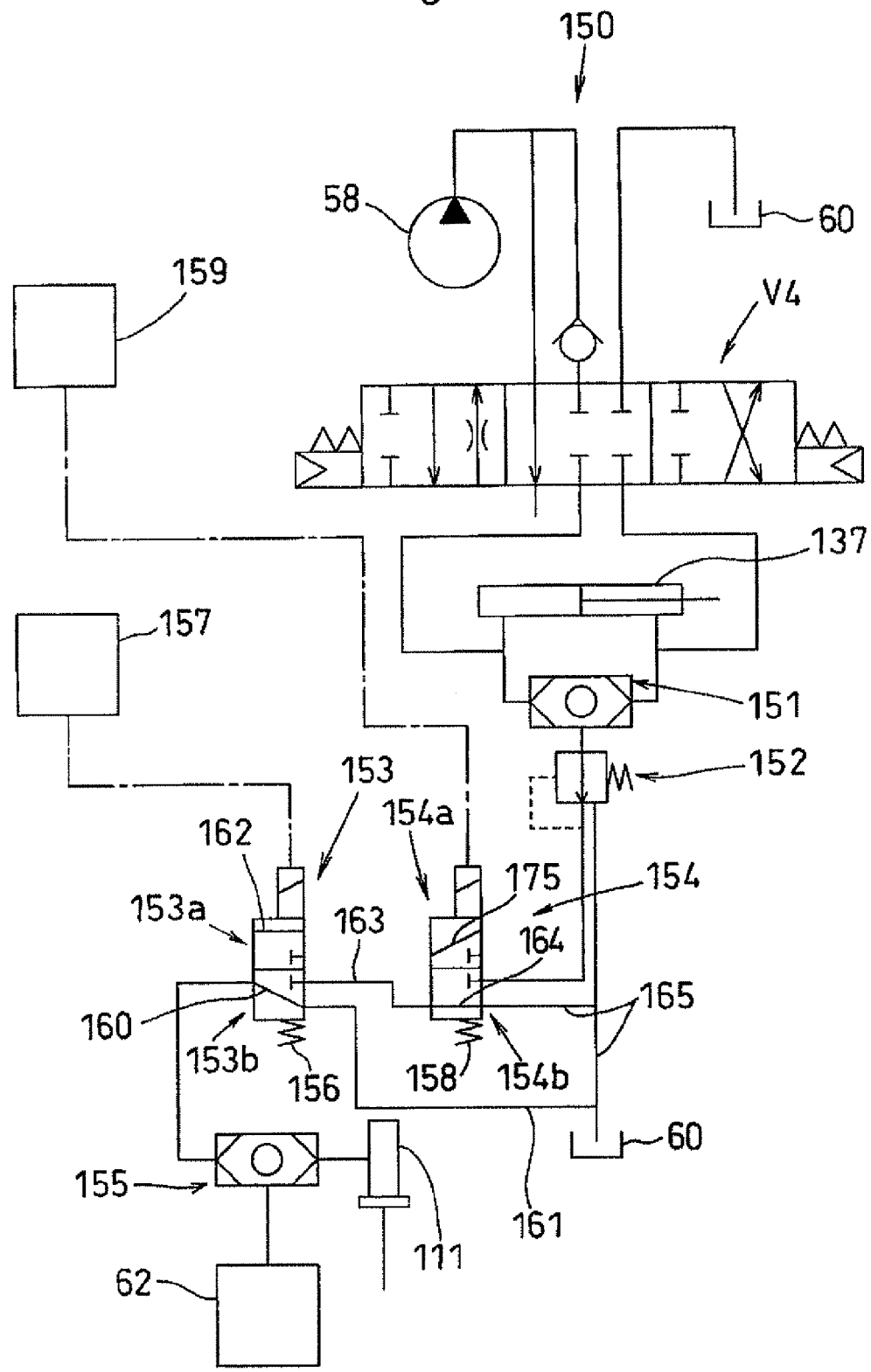
FIG. 9 is a system schematic construction view showing an example of an automatic brake system.
Figure 10:
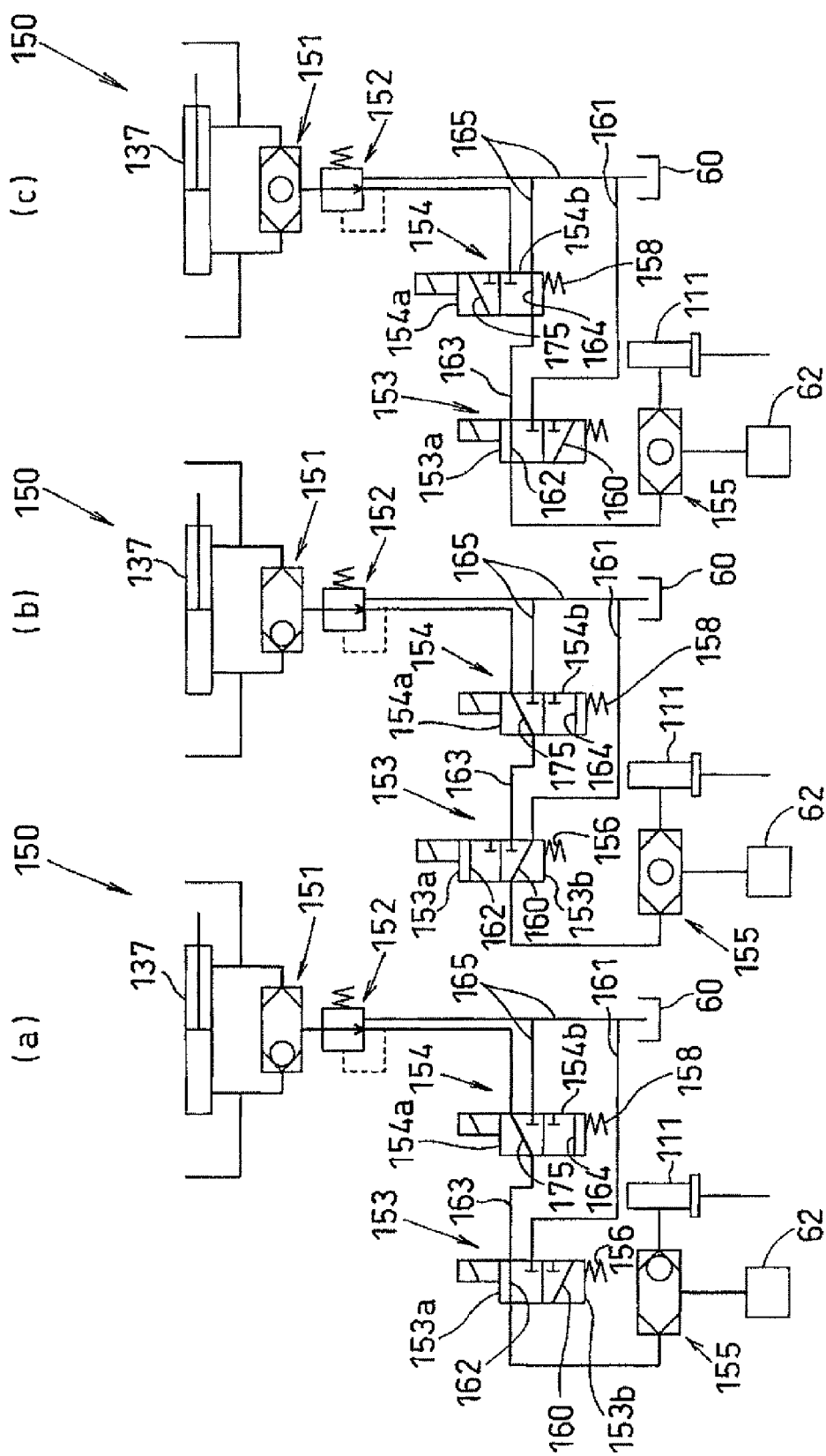
FIG. 10 is a system schematic construction view illustrating operations of the automatic brake system shown in FIG. 9.

The automatic brake system 150 shown in FIG. 9 and FIG. 10 is configured such that when the traveling pedal 110 is not stepped on (not operated) and the arm 122 is pivoted, a portion of the work oil fed to the arm cylinder 137 is forwarded to the main brake 62, so that this main brake 62 is actuated to brake the wheels 4, 5 (front and rear wheels 4, 5).

Therefore, with the wheel loader 1 according to the instant embodiment, the main brake 62 is used not only as the traveling brake for braking the wheels 4, 5 in response to a stepping operation on the brake pedal 100, but also as an automatic brake for braking the wheels 4, 5 in operative association with a pivotal movement of the arm 122 when the traveling pedal 110 is not operated and the arm 122 is pivoted.

Incidentally, the traveling brake and the automatic brake may be provided separately from each other. And, the automatic brake is not limited to the hydraulically operated brake, but can be a mechanical operation type brake. Further, this need not be a disc brake, but can be a drum brake or any other type of brake.

As shown in FIG. 9 and FIG. 10, the automatic brake system 150 includes a first shuttle valve 151, a pressure reducing valve 162, a first switchover valve 153, a second switchover valve 154 and a second shuttle valve 155.

The first switchover valve 153 can be switched over between a communicating position 153a for allowing communication of work oil from the pressure reducing valve 152 (arm cylinder 137 side) to the main brake 62 side when the traveling pedal 110 is not operated and a shutting position 153b for shutting off the communication of the work oil from the pressure reducing valve 152 (arm cylinder 137 side) to the main brake 62 side when the traveling pedal 110 is operated.

The second switchover valve 154 is incorporated in a work oil communication passageway between the first switchover valve 153 and the pressure reducing valve 152 (arm cylinder 137 side) and can be switched over between a communicating position 154a for allowing communication of work oil from the pressure reducing valve 152 (arm cylinder 137 side) to the first switchover valve 153 when the arm 122 is pivoted and a shutting position 154b for shutting off the communication of the work oil from the pressure reducing valve 152 (arm cylinder 137 side) to the first switchover valve 153 when the arm 122 is not pivoted.

The second shuttle valve 155 is capable of selectively feeding, to the main brake 62, either one (the one having the higher pressure) of the work oil fed from the master cylinder 111 (brake pedal 109 side) and the work oil fed from the first switchover valve 153 (arm cylinder 137 side) when the traveling pedal 110 is not operated and the arm 122 is pivoted at the same time.

The first switchover valve 163 is comprised of an electromagnetic valve which is urged by a spring 156 to the direction to be switched over to the shutting position 153b and which also is switched over to the communicating position 153a in response to an electric signal (ON signal). When the traveling pedal 110 is stepped on, a traveling sensor 157 comprised of e.g. a limit switch or the like which detects whether the traveling pedal 110 is being stepped on or not, is turned OFF (OFF signal is transmitted to the first switchover valve 153), whereby the first switchover valve 153 is demagnetized and this first switchover valve 153 is switched over to the shutting position 163b. Whereas, when the traveling pedal 110 is not being stepped on, the traveling sensor 157 is turned ON (ON signal is transmitted to the first switchover valve 153), whereby the first switchover valve 153 is magnetized and this first switchover valve 153 is switched over to the communicating position 153a.

The second switchover valve 154 is an electromagnetic switchover valve which is urged by a spring 158 to the direction to be switched over to the shutting position 154b and which also is switched over to the communicating position 154a in response to an electric signal (ON signal). When the arm 122 is not pivoted, an arm sensor 159 comprised of e.g. a limit switch or the like which detects whether the arm operating lever 146 for operating the arm is being operated or not, is turned OFF, whereby the second switchover valve 154 is demagnetized and this second switchover valve 154 is switched over to the shutting position 164b. Whereas, when the arm 122 is pivoted, the arm sensor 159 is turned ON, whereby the second switchover valve 154 is magnetized and this second switchover valve 154 is switched over to the communicating position 154a.

With the automatic brake system 150 having the above-described construction, for instance, in case a scooping operation of earth/sand or the like is to be effected, from the working posture where the pivot 130 of the bucket 123 is located downwardly of the pivot 121 of the arm 122 and the bottom face of the bucket 123 is placed in opposition to the ground surface and the arm 122 has been pivoted to bring the bucket 123 closer to the machine body 1 as illustrated in FIG. 1, the wheel loader 1 will be caused to travel forward to bring the leading end of the bucket 123 to the vicinity of or contact with the earth/sand or the like and then the forward traveling will be stopped. To do these, the stepping operation on the traveling pedal 110 will be released and at the same time, the scooping action of the bucket 123 will be effected with pivoting the arm 122 forwardly. Then, as shown in FIG. 10(a), the first switchover valve 153 and the second switchover valve 154 are switched over respectively to the communicating positions 153a, 154a, so that a portion of the work oil fed to the rod side of the arm cylinder 137 will be fed to the rear face side of the main brake piston 68 of the piston housing portion 69 of the main brake 63 via: the first shuttle valve 151→pressure reducing valve 152→communication oil passage 175 of second switchover valve 164→communication oil passage 162 of the first switchover valve 163→second shuttle valve 155, whereby the main brake 62 is actuated to brake the wheels 4, 5.

With this, even when the foot is removed from the traveling pedal 110 in the course of the scooping action of the bucket 123 with pivoting the arm 122 forwardly, there occurs no inadvertent backward movement of the wheel loader 1 due to the reaction force from the earth/sand or the like. And, the series of operations: forward travel→scooping movement, can proceed without interruption, so that the scooping operation of earth/sand or the like can be carried out smoothly.

Further, if the traveling pedal 110 is stepped on at the time of pivotal movement of the arm 122, as shown in FIG. 10(b), the first switchover valve 153 is switched over to the shutting position 153b, so that the first switchover valve 153 shuts off the communication of the portion of the work oil fed to the arm cylinder 137 to the main brake 62 side and at the same time, the work oil present inside the piston housing portion 69 of the main brake 62 will be tank-drained via: second shuttle valve 155→drain oil passage 160 of the first switchover valve 153→drain circuit 161 from the first switchover valve 63 to work oil tank (oil pan) 60, whereby the braking of the wheels 4, 5 is released.

Therefore, during traveling, even if the arm 122 is pivoted, the main brake 62 will not be activated.

Further, if the pivotal movement of the arm 122 is stopped while the stepping on the traveling pedal 110 is released, as shown in FIG. 10(c), the second switchover valve 154 will be switched over to the shutting position 154b, the work oil present inside the piston housing portion 69 of the main brake 62 will be tank-drained via: second shuttle valve 155→communication oil passage 162→pipe passage 163 between the first switchover valve 63 and the second switchover valve 164→drain oil passage 164 of the second switchover valve 164→drain circuit 16 from the second switchover valve 154 to work oil tank (oil pan) 60, whereby the braking of the wheels 4, 5 is released.

With the automatic brake system 150 having the above-described construction in operation, as shown in FIG. 10(b), under the condition where the traveling pedal 110 is being stepped on and the arm 122 is being pivoted, if the pivotal movement of the arm 122 is stopped, the pipe passage 163 between the first switchover valve 153 and the second switchover valve 164 becomes communicated with the work oil tank 60 via the drain oil passage 164 of the second switchover valve 164 and the drain circuit 165, so that no trapped pressure will remain within the pipe passage 163 between the first switchover valve 153 and the second switchover valve 164 (if such trapped pressure is present, this trapped pressure will act on the main brake 62 to apply braking force to the wheels 4, 5, thus generating a shock) when a stepping action on the traveling pedal 110 is released while the arm 122 is not pivoted and during traveling).

The drain oil passage 164 of the second switchover valve 154 and the drain circuit 165 together constitute a pressure relief circuit for relieving pressure in the pipe passage 163 extending between the first switchover valve 153 and the second switchover valve 154 when the traveling pedal 110 is being operated and the arm 122 is being not pivoted.

Further, if the brake pedal 109 is stepped on while the traveling pedal 110 is not being stepped on, the work oil (brake oil) is fed from the master cylinder 111 via the second shuttle valve 155 to the main brake 62, whereby this main brake 62 is activated.

Incidentally, according to one alternative construction of the automatic brake system 150 having the above-described construction, the first switchover valve 153, when demagnetized, is switched over by a spring, to the communicating position 163a and switched over, when magnetized, to the shutting position 154b.

Further, the second switchover valve 154 may be incorporated within the wok oil flow passage extending between the first switchover valve 153 and the second shuttle valve 155.

Furthermore, the first switchover valve 153 and/or second switchover valve 154 may be comprised of a pilot operation switchover valve operated by pilot work oil. In this case, e.g. if the first switchover valve 153 is comprised of a pilot operation switchover valve, in response to a stepping operation on the traveling pedal 110, the first switchover valve 153 will be switched over to the shutting position 153b by the pilot work oil from the traveling remote control valve 114. And, when the traveling pedal 110 is not stepped on, the first switchover valve 153 will be switched over to the shutting position 153a by means of the spring.

If the second switchover valve 154 is comprised of a pilot operation switchover valve, in response to an operation on the operating lever 146 for arm operation, the second switchover valve 154 will be switched over to the communicating position 154a by the pilot work oil from the arm/swivel remote control valve 117. And, when the arm operating lever 146 is not operated, the second switchover valve 154 will be switched over to the shutting position 154b by means of the spring.

Further, with the automatic brake system 150 having the above-described construction, with the traveling pedal 110 is not operated and the arm 122 is pivoted, in association with the pivotal movement of the arm 122, a portion of the work oil fed to the arm cylinder 137 is fed to the brake 62 (automatic brake). However, the invention is not limited thereto. An alternative construction is possible wherein the work oil is fed to the main brake 62 from an appropriate portion of the feed circuit of the work oil discharged from the main pump 58, Further, the pilot work oil from the arm/swivel remote control valve 147 for controlling the arm control valve V4 to the arm/swivel remote control valve 147 may be used as a work oil for activating the main brake 62 when the arm 122 is pivoted while the traveling pedal 110 is not being operated.

Further, respecting design change matters applicable to embodiments to be described later can be design-changed similarly.

An automatic brake system 150 shown in FIG. 11(a) includes two of the above-described second switchover valves 154 comprised of electromagnetic valves in juxtaposition in the work oil communication passage extending from the speed reducing valve 152 (arm cylinder 137 side) to the first switchover valve 153 and includes also a third shuttle valve 166 for feeding the work oil past the second switchover valve 154 switched over to the communicating position 154a of the two second switchover valves 164, to the first switchover valve 153. In these respects the system differs from the above-described automatic brake system 150. The rest of the construction is substantially identical to the automatic brake system 150 shown in FIG. 9.

Of the two second switchover valves 154, one second switchover valve 154 is configured as a second switchover valve 154 which is magnetized when the arm operating means is operated to pivot the arm 122 in one direction, to be switched over to the communicating position 154a. The other second switchover valve 154 is configured as a second switchover valve 154 which is magnetized when the arm operating means is operated to pivot the arm 122 in the other direction, to be switched over to the communicating position 154a.

As the arm operating means, there is employed an operating means which includes an operating button for expanding the arm cylinder 137 and an operating button for contracting the arm cylinder 137, and the arm/swivel remote control valve 147 is operated by pressing operations on these operational buttons. One second switchover valve 154 is energized by a switch 167 which is turned ON In response to a pressing operation on one operational button. The other second switchover valve 154 is energized by a switch 168 which is turned ON in response to a pressing operation on the other operational button. Upon release of the pressing operations on the operational buttons, the switches 167, 168 are turned OFF, whereby the second switchover valves 154 will be demagnetized.

Incidentally, in the case of the construction including the operational button for expanding the arm cylinder 137 and the operational button for contracting the arm cylinder 137 and the arm 122 is expanded/contracted with the pressing operations of these operational buttons, the arm control valve V4 may be comprised of an electromagnetic valve, so that the arm control valve V4 may be controlled by an electric signal generated by a pressing operation on the operational button.

Further, an automatic brake system 150 shown in FIG. 11(b) differs from the automatic brake system 150 shown in FIG. 11(a) in that this system omits the first shuttle valve 151 and includes a pressure reducing valve 152 in a work oil communication passage extending from the first switchover valve 153 and the third shuttle valve 166. The rest of the construction is substantially identical to the automatic brake system shown in FIG. 11(a).

Figure 11:
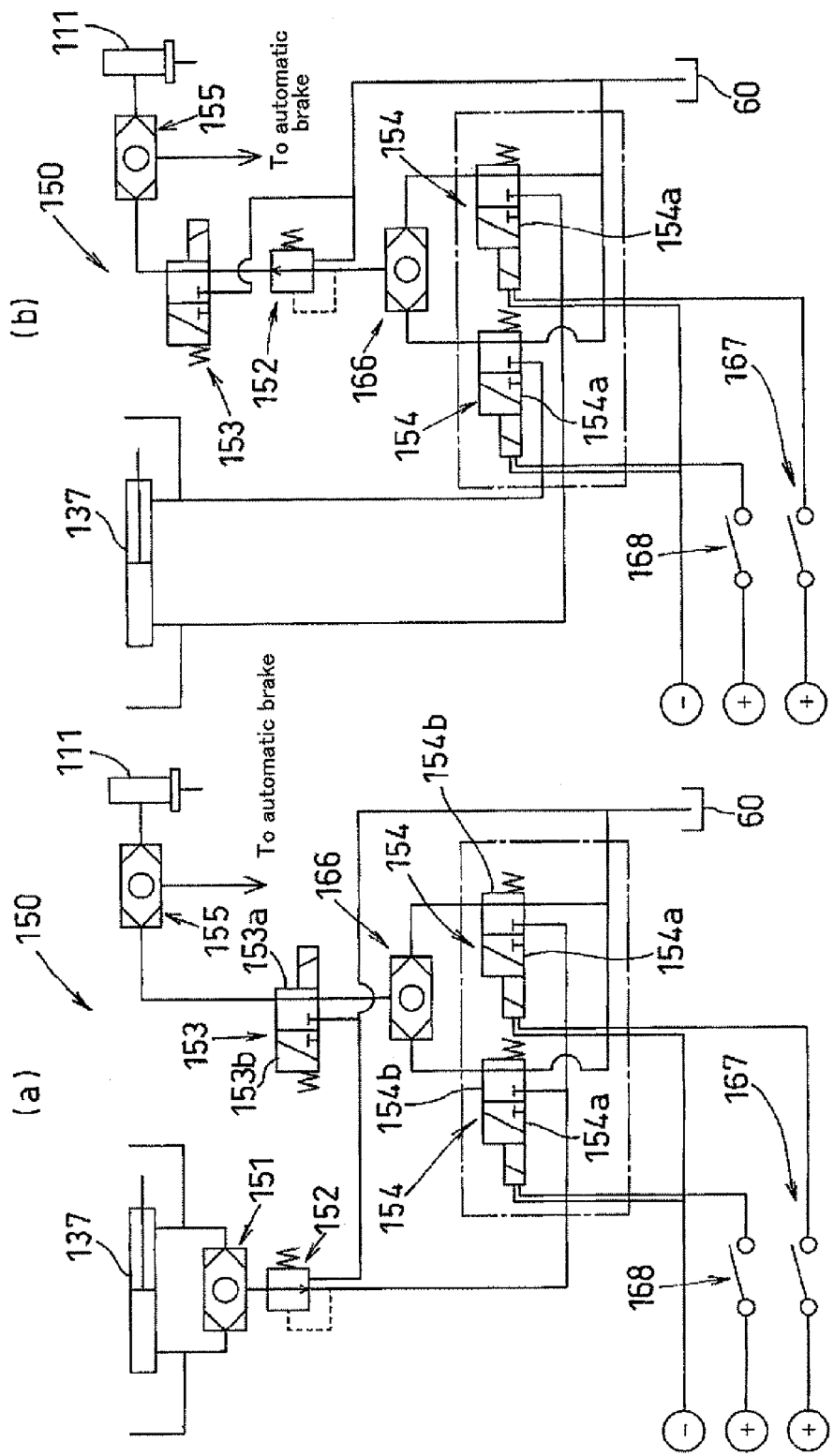
FIG. 11 is a system schematic construction view showing another example of an automatic brake system.
Figure 12:
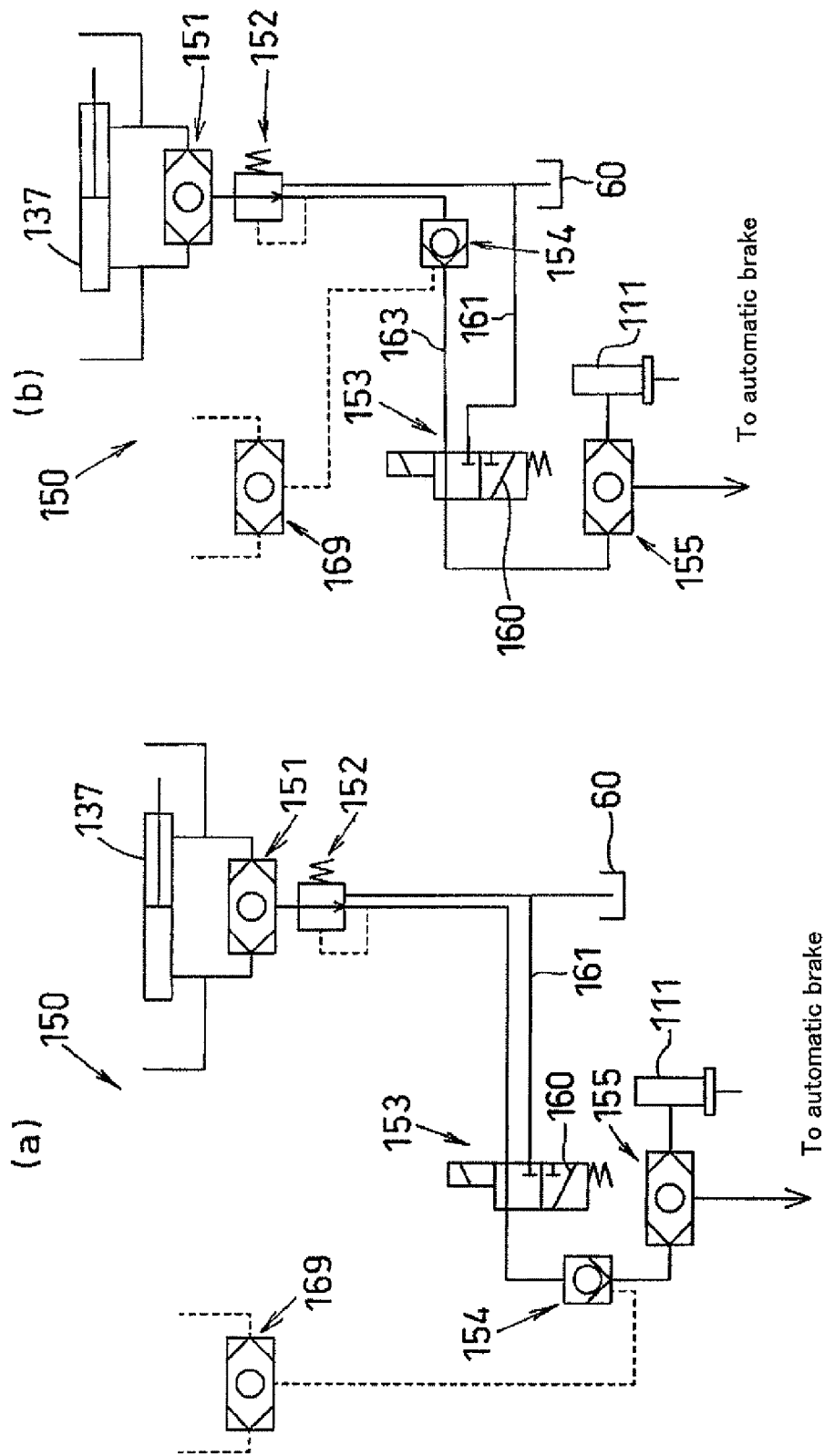
FIG. 12 is a system schematic construction view showing another example of an automatic brake system.
Figure 13:
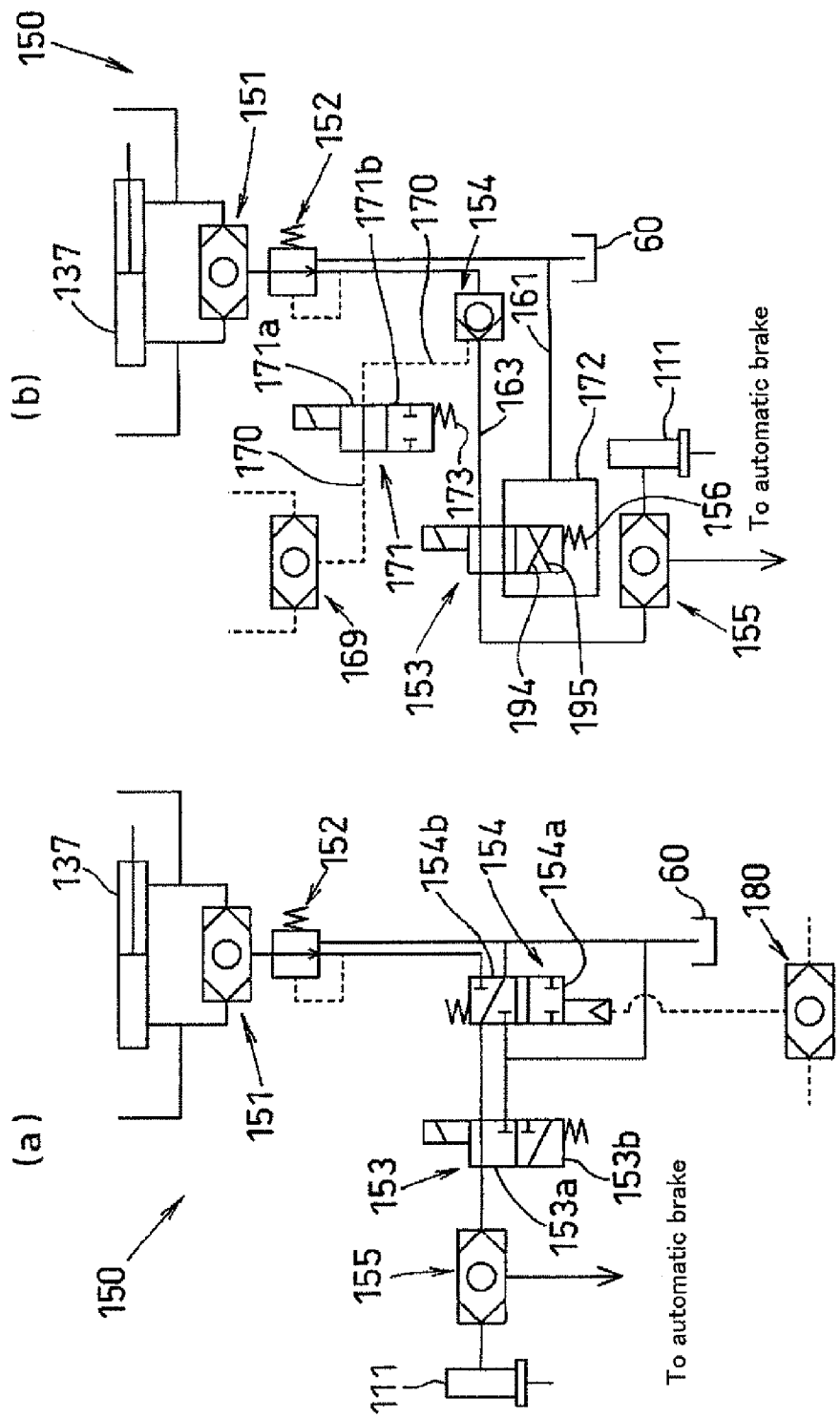
FIG. 13 is a system schematic construction view showing another example of an automatic brake system.
Figure 14:
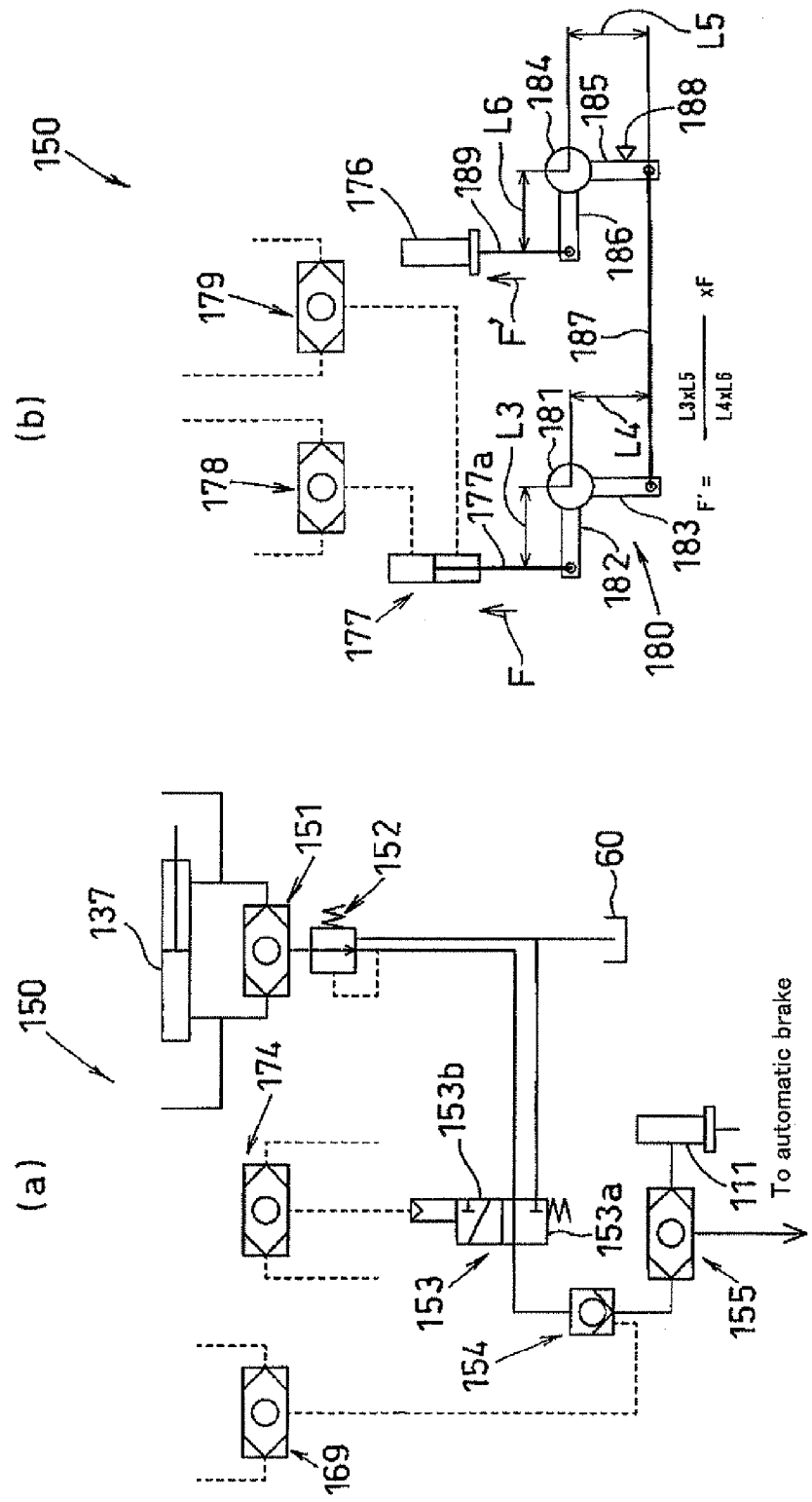
FIG. 14 is a system schematic construction view show another example of an automatic brake system.

Incidentally, in the automatic brake systems 150 shown in these FIG. 11, there may be provided a detecting sensor such as a limit switch for detecting a pivot operation when the arm operating lever described above is pivoted in one direction and a detecting sensor such as a limit switch for detecting a pivot operation when the arm operating lever described above is pivoted in the other direction, so that in response to detection signal from one detecting sensor, one second switchover valve 154 is switched over and in response to detection signal from the other detecting sensor, the other second switchover valve 154 is switched over.

An automatic brake system 150 shown in FIG. 12(a) differs in that a pilot check valve is employed as the second switchover valve 154 included in the automatic brake system 150 shown in FIG. 9 and this pilot check valve is incorporated in the work oil communication passage extending between the first switchover valve 153 and the second shuttle valve 155, and there is provided a third shuttle valve 169 for sending, to the second switchover valve 154, the pilot work oil of the higher pressure side of the two lines of pilot work oil (one for the arm cylinder expansion and the other for the arm cylinder contraction) sent from the arm/swivel remote control valve 147 to the arm control valve V4. The rest of the construction is substantially identical to the automatic brake system 150 shown in FIG. 9.

With this automatic brake system 150, when the arm operating lever 146 is not being operated, the second switchover valve 154 is closed. When the traveling pedal 110 is not stepped on and the arm 122 is pivoted, the first switchover valve 153 is magnetized to be switched over to the communicating position 153a and also the second switchover valve 154 is opened by the pilot work oil from the arm/swivel remote control valve 147, so that a portion of the work oil fed to the arm cylinder 137 is sent via the pressure reducing valve 152 to the first switchover valve 153 and flows past the first switchover valve 153 and the second switchover valve 154 and is sent via the second shuttle valve 155 to the main brake 62 to brake the wheels 4, 5.

Further, with this automatic brake system 150, when the traveling pedal 110 is stepped when the arm 122 is not being pivoted, the work oil is tank-drained from the main brake 62: via: second shuttle valve 155→second switchover valve 154→drain oil passage 160 of the first switchover valve 153→drain circuit 161, thus releasing the operation of the main brake 62.

Further, the automatic brake system 150 shown in FIG. 12(b) differs from the automatic brake system shown in FIG. 12(a) in that the second switchover valve 154 is incorporated in the work oil communication passageway between the pressure reducing valve 152 and the first switchover valve 153. The rest of the construction is substantially identical to the automatic brake system 150 shown in FIG. 12(a).

Incidentally, with this automatic brake system 150, if the traveling pedal 110 is stepped on during pivotal movement of the arm 122, there is developed a trapped pressure in the pipe passage 163 between the first switchover valve 153 and the second switchover valve 154. Therefore, the second switchover valve 154 comprised of a pilot check valve should be incorporated between the first switchover valve 153 and the second shuttle valve 155.

In an automatic brake system 150 shown in FIG. 13(a), the second switchover valve 154 used in the automatic brake system 150 shown in FIG. 9 is comprised of a pilot operation switchover valve switched over by a pilot operation pressure and there is provided a third shuttle valve 180 for sending the high pressure side pilot work oil from the arm/swivel remote control valve 147 to the second switchover valve 154, so that the second switchover valve 154 is switched over to the communicating position 154a by the pilot work oil from the arm/swivel remote control valve 147. The rest of the construction is substantially identical to the automatic brake system 150 shown in FIG. 9.

An automatic brake system 150 shown in FIG. 13(b) differs from the automatic brake system shown in FIG. 12(b) in that a third switchover valve 171 is incorporated in the pilot oil passage 170 between the third shuttle valve 169 and the second switchover valve 154 of the automatic brake system 150 of FIG. 12(b) and the first switchover valve 153 includes a first drain oil passage 194 for draining the work oil from the automatic brake to the drain circuit 161 in case the first switchover valve 153 is switched over during operation of the traveling pedal 110 and a second drain oil passage 195 for draining the pressure of the pipe passage 163 between the first switchover valve 153 and the second switchover valve 154 to the drain circuit 161 via the drain pipe passage 172. The rest of the construction is substantially identical to the automatic brake system 150 shown in FIG. 12(b).

The third switchover valve 171 is comprised of an electromagnetic switchover valve, which is magnetized when the traveling pedal 110 is not stepped on, to be switched over to a communicating position 171a for allowing passage of the pilot work oil. When the traveling pedal 110 is stepped on, the valve is demagnetized to be switched over by a spring 173 to a shutting position 171b for shutting off the communication of the pilot work oil 170.

In this automatic brake system 150, when the traveling pedal 110 is operated and the arm 122 is not pivoted, no trapped pressure will develop in the pipe passage 163 between the first switchover valve 153 and the second switchover valve 154.

In an automatic brake system 150 shown in FIG. 14(a), the first switchover valve 153 in the automatic brake system 150 shown in FIG. 12(a) is comprised of a pilot operation switchover valve which is switched over to a shutting position 153b by the pilot work oil from the traveling remote control valve 114 when the traveling pedal 110 is stepped forwardly or rearwardly and there is provided a fourth shuttle valve 174 for sending the pilot operation oil from the traveling remote control valve 114 to the first switchover valve 153 when the traveling pedal 110 is stepped forwardly or rearwardly. The rest of the construction is substantially identical to the automatic brake system 150 shown in FIG. 12(a).

With this automatic brake system 150, when the traveling pedal 110 is not being stepped on, no pilot operation pressure acts on the first switchover valve 153, so the first switchover valve 153 is adapted to be switched over to the communicating position 153a by means of a spring 156.

An automatic brake system 150 shown in FIG. 14(b) includes a master cylinder 176 for feeding work oil to the automatic brake (this can be the above-described main brake 62 acting also as a traveling brake or a brake dedicated to the automatic brake system 150), an automatic brake cylinder 177, a traveling shuttle valve 178 for sending a portion (high pressure side) of the pilot work oil from the traveling remote control valve 114 to the bottom side of the automatic brake cylinder 177 when the traveling pedal 110 is stepped on forwardly or rearwardly, an arm shuttle valve 179 for sending a portion of the pilot work oil sent from the arm/swivel remote control valve 147 to the rod side of the automatic brake cylinder 177 when the arm operating lever 146 is pivoted to one side or the other side, and a transmission mechanism 180 for transmitting movement of a piston rod 177a of the automatic brake cylinder 177 to the master cylinder 176.

The transmission mechanism 180 includes a first arm 182 and a second arm 183 having base portions thereof fixed to a pivotable first pivotal portion 181, a third arm 185 and a fourth arm 186 having base portions thereof fixed to a pivotable second pivotal portion 183, a coupling link 187 for operably coupling the leading end side of the second arm 183 with the leading end side of the third arm 185, and a stopper 188 which comes into contact with a third link to restrict movement of the piston rod 177a of the automatic brake cylinder 177 in its projecting direction.

To the leading end side of the first arm 182, the leading end side of the piston rod 177a of the automatic brake cylinder 177 is operably coupled. To the leading end side of the fourth arm 186, the leading end side of a push rod 198 of the master cylinder 176 is operably coupled. In operation, as the piston rod 177a of the automatic brake cylinder 177 is retracted, the first arm 182 is pulled, so that the first, second arms 12 are pivoted, and also the third arm 185 is pulled by the coupling link 178, so that the third, fourth arms 122 are pivoted. And, the push rod 198 of the master cylinder 176 is pushed in by the fourth arm 186, thus pressing the piston inside this master cylinder 176. With this, the work oil in the master cylinder 176 is sent to the automatic brake, whereby the automatic brake is activated to brake the wheels 4, 5.

With this automatic brake system 150, when the arm operating lever 146 is operated, the pilot work oil from the arm/swivel remote control valve 147 is fed via the arm shuttle valve 179 to the rod side of the automatic brake cylinder 177.

In the above, if the traveling pedal 110 is being stepped on, the pilot work oil from the traveling remote control valve 114 is fed via the traveling shuttle valve 178 to the bottom side of the automatic brake cylinder 177, so that the pressure of the bottom side having the larger pressure receiving area is increased, hence, no movement in the retracting direction of the piston rod 177a of the automatic brake cylinder 177 occurs.

Incidentally, excess pilot work oil will be drained via a relief valve.

Further, at the time of operation of the arm operating lever 146, if the traveling pedal 110 is not being stepped on, the pressure of the rod side of the automatic brake cylinder 177 is increased, so that the piston rod 177a of this automatic brake cylinder 117 is retracted to activate the automatic braking.

Also, upon release of the operation on the arm operating lever 146, the pilot work oil on the rod side of the automatic brake cylinder 177 will be drained via the arm shuttle valve 179 to the drain circuit, thereby releasing the automatic braking.

An automatic brake system 150 shown in FIG. 15(a) includes a traveling switchover valve 191 incorporated in a work oil communication oil passageway extending from the main pump 58 to the bottom side of the automatic brake cylinder 177, a pilot check valve 192 disposed upstream of this traveling switchover valve 191, an arm shuttle valve 179 for sending, to the pilot check valve 192, a portion of the pilot work oil sent from the arm/swivel remote control valve 147 to the arm control valve V4 when the arm operating lever 146 is pivoted to one or the other side, and a transmission mechanism 180 for transmitting movement of the piston rod 177a of the automatic brake cylinder 177 to the master cylinder 176.

The traveling switchover valve 191 is comprised of a switchover valve similar to the first switchover valve 153 described above. The pilot check valve 192 is comprised of a pilot check valve similar to the second switchover valve 154 described above. The transmission mechanism 180 differs from the above-described transmission mechanism 180 in that the stopper 188 provided in the latter is not provided and the direction of the fourth arm 186 is different, the rest of the construction being substantially identical to that of the above-described transmission mechanism.

With this automatic brake system 150, when the traveling pedal 110 is not stepped on, the traveling switchover valve 191 has been switched over to the shutting position 191b. When the arm operating lever 146 is not being operated, the pilot check valve 192 is closed. If the arm operating lever 146 is operated and at the same time the traveling pedal 110 is rendered to the non-stepped condition, the pilot work oil from the arm/swivel remote control valve 147 is sent via the arm shuttle valve 179 to the pilot check valve 192, so that this pilot check valve 192 is opened and also the traveling switchover valve 191 is magnetized to be switched over to the communicating position 191a, so that the work oil from the main pump 58 is fed to the bottom side of the automatic brake cylinder 177.

And, the piston rod 177a of the automatic brake cylinder 177 is projected to push the first arm 182, whereby the first, second arms 122 are pivoted and the third arm 185 is pushed by the coupling link 197, whereby the third, fourth arms 122 are pivoted and the push rod 198 of the master cylinder 176 is pushed in by the fourth arm 186, so that the piston inside this master cylinder 176 is pressed. With this, the work oil present inside the master cylinder 176 is sent to the automatic brake, so that the automatic brake is activated to brake the wheels 4, 5.

Figure 15:
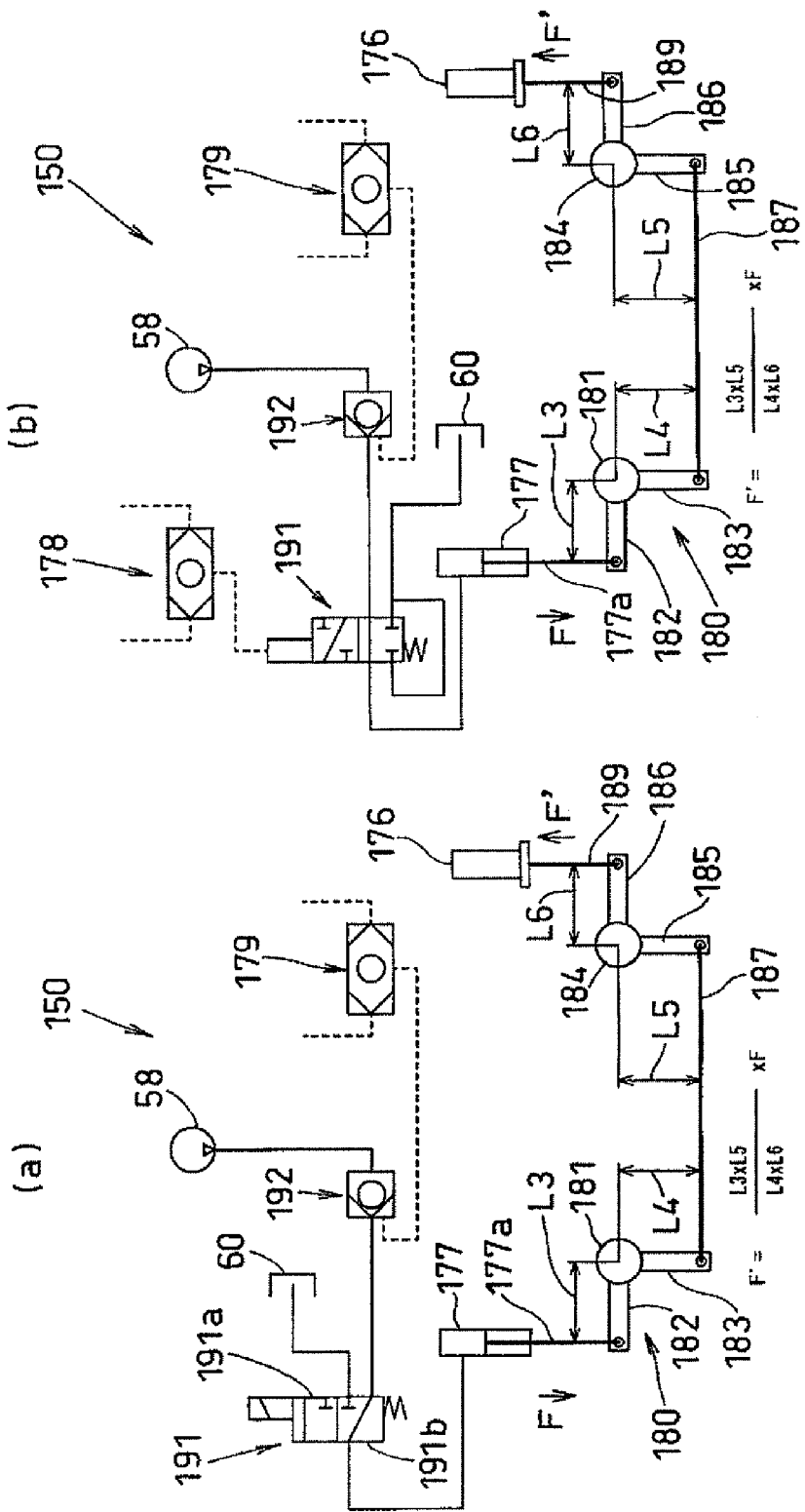
FIG. 15 is a system schematic construction view showing another example of an automatic brake system.

An automatic brake system shown in FIG. 15(b) differs from the automatic brake system shown in FIG. 15(a) in that the traveling switchover valve 191 used in the latter is comprised now of a pilot operation switchover valve and there is provided a traveling shuttle valve 178 for sending a portion of the pilot work oil from the traveling remote control valve to the traveling switchover valve 191 when the traveling pedal 110 is stepped on forwardly or rearwardly. The rest of the construction is substantially identical to that of the automatic brake system 150 shown in FIG. 15(*b*).

The present invention is applicable to a wheel loader having a machine body travelably supported on wheels and a work device mounted on the machine body.

DESCRIPTION OF REFERENCE MARKS

4 front wheels
5 rear wheels
6 traveling machine body
62 brake
93 swivel machine body
95 work device
109 brake pedal (traveling line brake operating means)
110 traveling pedal (travel operating means)
120 boom
122 arm
123 bucket (work implement)
137 arm cylinder
146 operating lever (arm operating means)
150 automatic brake system
153 first switchover valve
154 second switchover valve
155 shuttle valve
163 pipe passage
164, 164 pressure relief circuits
V4 arm control valve

The invention claimed is:

1. A wheel loader comprising:
a machine body travelably supported on wheels;
a work device including a boom having a base portion thereof pivotally supported to the machine body, an arm pivotally connected to the leading end of the boom, and a work implement pivotally provided to the leading end side of the arm;
a travel operating means for effecting a traveling operation of the machine body;
an arm cylinder for pivoting the arm; and
a hydraulic operating type brake for braking the wheels;
wherein when said travel operating means is effecting a travel stopping operation for stopping the machine body and work oil is fed to the arm cylinder, a portion of the work oil fed to the arm cylinder is fed to said brake, so that said brake is actuated by this work oil.

2. The wheel loader according to claim 1, wherein a work oil passageway extending from said arm cylinder to said brake incorporates therein a first switchover valve for allowing passage of the work oil from the arm cylinder to the brake when the travel operating means effects the travel stopping operation and for inhibiting said passage when the travel operating means effects the traveling operation; and
between said first switchover valve and said arm cylinder, there is provided a second switchover valve for allowing passage of the work oil from the arm cylinder to the first switchover valve when the arm is pivoted and for inhibiting said passage when the arm is not pivoted.

3. The wheel loader according to claim 2, wherein there is provided a pressure relief circuit for relieving pressure in a pipe passage extending between the first switchover valve and the second switchover valve when the travel operating means is operated and the arm is not pivoted.

4. The wheel loader according to claim 1, wherein a work oil passageway extending from said arm cylinder to said brake incorporates therein a first switchover valve for allowing passage of the work oil from the arm cylinder to the brake when the travel operating means effects the travel stopping means and for inhibiting said passage when the travel operating means effects the traveling operation; and
between said first switchover valve and said brake, there is provided a second switchover valve for allowing passage of the work oil from the first switchover valve to said brake when the arm is pivoted and for inhibiting said passage when the arm is not pivoted.

5. The wheel loader according to claim 2, wherein said second switchover valve is switched over in response to either a hydraulic signal sent from a pilot valve for operating an arm control valve for controlling said arm cylinder or an electric signal transmitted when an arm operating means for operating the arm is operated.

6. The wheel loader according to claim 2, wherein said second switchover valve comprises a plurality of electromagnetic valves, including an electromagnetic switchover valve which is switched over for allowing passage of work oil if said arm operating means is operated to pivot the arm in one direction, and an electromagnetic switchover valve which is switched over for allowing passage of work oil if said arm operating means is operated to pivot the arm in the other direction.

7. The wheel loader according to claim 2, wherein said brake is operable also in response to work oil fed by a traveling line brake operating means which is manually operated during traveling; and
either the work oil fed by said traveling line brake operating means, or the work oil fed from the arm cylinder side when said travel operating means is effecting the travel stopping operation for stopping the machine body and the work oil is fed to the arm cylinder, can be fed selectively via a shuttle valve.

8. The wheel loader according to claim 1, wherein there is provided a differential device for transmitting power outputted from the engine to the right and left wheels; and said brake brakes the power inputted to said differential device.

9. The wheel loader according to claim 4, wherein said second switchover valve is switched over in response to either a hydraulic signal sent from a pilot valve for operating an arm control valve for controlling said arm cylinder or an electric signal transmitted when an arm operating means for operating the arm is operated.

10. The wheel loader according to claim 4, wherein said second switchover valve comprises a plurality of electromagnetic valves, including an electromagnetic switchover valve which is switched over for allowing passage of work oil if said arm operating means is operated to pivot the arm in one direction, and an electromagnetic switchover valve which is switched over for allowing passage of work oil if said arm operating means is operated to pivot the arm in the other direction.

11. The wheel loader according to claim 4, wherein said brake is operable also in response to work oil fed by a traveling line brake operating means which is manually operated during traveling; and
either the work oil fed by said traveling line brake operating means, or the work oil fed from the arm cylinder side when said travel operating means is effecting the travel stopping operation for stopping the machine body and the work oil is fed to the arm cylinder, can be fed selectively via a shuttle valve.

* * * * *